(12) United States Patent
Lee et al.

(10) Patent No.: US 12,181,937 B2
(45) Date of Patent: Dec. 31, 2024

(54) ELECTRONIC DEVICE INCLUDING CAMERA MODULE

(71) Applicant: Samsung Electronics Co., Ltd., Suwon-si (KR)

(72) Inventors: Kyeongeun Lee, Suwon-si (KR); Jeongyeol Lee, Suwon-si (KR); Sunggwan Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 17/440,507

(22) PCT Filed: Sep. 16, 2021

(86) PCT No.: PCT/KR2021/012701
§ 371 (c)(1),
(2) Date: Sep. 17, 2021

(87) PCT Pub. No.: WO2022/060126
PCT Pub. Date: Mar. 24, 2022

(65) Prior Publication Data
US 2022/0321748 A1    Oct. 6, 2022

(30) Foreign Application Priority Data
Sep. 18, 2020   (KR) .......................... 10-2020-0120609

(51) Int. Cl.
*H04M 1/02*   (2006.01)
*G06F 1/16*   (2006.01)
(Continued)

(52) U.S. Cl.
CPC .......... *G06F 1/1686* (2013.01); *G06F 1/1605* (2013.01); *H04M 1/0264* (2013.01);
(Continued)

(58) Field of Classification Search
CPC .... G06F 1/1652; G06F 1/1686; G06F 1/1605; G06F 1/1681; H04M 1/0264;
(Continued)

(56) References Cited

U.S. PATENT DOCUMENTS 8,711,566 B2   4/2014   O'Brien
9,195,272 B2   11/2015  O'Brien
(Continued)

FOREIGN PATENT DOCUMENTS

CN   110675835 A  *  1/2020   .............. G06T 7/11
CN   210091013 U     2/2020
(Continued)

OTHER PUBLICATIONS

International Search Report dated Jan. 3, 2022, issued in International Application No. PCT/KR2021/012701.
(Continued)

*Primary Examiner* — Nidhi Thaker
(74) *Attorney, Agent, or Firm* — Jefferson IP Law, LLP

(57) ABSTRACT

An electronic device is provided. The electronic device includes a housing including a plate structure, a display disposed on the plate structure and including a plurality of layers including a cover layer forming part of a surface of the housing and a panel layer including a light emitting element, and a camera module including a lens assembly including a plurality of lenses, the camera module being at least partially located in a space formed in the plate structure and coupled to the display such that an extension line of an optical axis passes through the panel layer and the cover layer. The panel layer includes a first area including a field of view of the camera module and a second area around the first area, and the number of light emitting elements per unit area of the first area is smaller than the number of light emitting elements per unit area of the second area.

9 Claims, 15 Drawing Sheets

(51) Int. Cl.
*H04N 23/51* (2023.01)
*H04N 23/57* (2023.01)
*H04N 23/55* (2023.01)

(52) U.S. Cl.
CPC ......... *G06F 1/1652* (2013.01); *H04M 1/0268* (2013.01); *H04N 23/51* (2023.01); *H04N 23/55* (2023.01); *H04N 23/57* (2023.01)

(58) Field of Classification Search
CPC ..... H04M 1/0268; H04N 23/54; H04N 23/57; H04N 23/51
See application file for complete search history.

(56) References Cited

U.S. PATENT DOCUMENTS

| | | | |
|---|---|---|---|
| 10,044,002 | B2 | 8/2018 | Lee et al. |
| 10,506,153 | B2 | 12/2019 | Kang et al. |
| 10,868,264 | B2 | 12/2020 | Shin et al. |
| 11,018,199 | B2 | 5/2021 | Hei et al. |
| 11,048,306 | B2 | 6/2021 | Kwak et al. |
| 11,112,838 | B2 | 9/2021 | Sung et al. |
| 11,277,549 | B2 | 3/2022 | Rho et al. |
| 11,770,967 | B2 | 9/2023 | Shin et al. |
| 11,971,743 | B2 * | 4/2024 | Tyagi .................... G06F 1/1641 |
| 2017/0094168 | A1 | 3/2017 | Kang et al. |
| 2017/0287992 | A1 * | 10/2017 | Kwak .................... G06F 1/1637 |
| 2018/0183911 | A1 * | 6/2018 | Lee ........................ G06F 1/1616 |
| 2019/0012544 | A1 * | 1/2019 | Park ........................ H04N 25/70 |
| 2019/0034011 | A1 * | 1/2019 | Li ........................ G06F 1/1643 |
| 2019/0212788 | A1 | 7/2019 | Kwak et al. |
| 2019/0246018 | A1 * | 8/2019 | Rho ........................ G03B 9/08 |
| 2019/0339746 | A1 * | 11/2019 | Kim .................... H04M 1/0264 |
| 2019/0369422 | A1 * | 12/2019 | Zeng ........................ G02F 1/139 |
| 2020/0012324 | A1 | 1/2020 | Sung et al. |
| 2020/0267293 | A1 * | 8/2020 | Noh ........................ G06F 1/1626 |
| 2020/0326754 | A1 * | 10/2020 | Kim ........................ G09F 9/301 |
| 2021/0098541 | A1 * | 4/2021 | Hei ........................ G06T 7/143 |
| 2021/0151425 | A1 * | 5/2021 | Kim .................... H04N 23/55 |
| 2021/0303092 | A1 * | 9/2021 | Delaporte ........... H04M 1/0268 |
| 2021/0325943 | A1 | 10/2021 | Kwak et al. |
| 2021/0365080 | A1 | 11/2021 | Sung et al. |
| 2022/0321748 | A1 * | 10/2022 | Lee ........................ H04N 23/51 |
| 2023/0156347 | A1 * | 5/2023 | Uhm .................... H10K 59/80 348/302 |

FOREIGN PATENT DOCUMENTS

| | | | | |
|---|---|---|---|---|
| EP | 3522503 | A1 * | 8/2019 | ........... G06F 1/1605 |
| EP | 3 547 101 | A1 | 10/2019 | |
| EP | 3547075 | A1 * | 10/2019 | ........... G06F 1/1601 |
| EP | 3933546 | A1 * | 1/2022 | ........... G06F 1/1616 |
| KR | 10-2017-0088457 | A | 8/2017 | |
| KR | 10-2018-0026288 | A | 3/2018 | |
| KR | 10-2019-0077107 | A | 7/2019 | |
| KR | 10-2019-0084397 | A | 7/2019 | |
| KR | 20190091711 | A * | 8/2019 | |
| KR | 10-2020-0005211 | A | 1/2020 | |
| KR | 10-2020-0036681 | A | 4/2020 | |

OTHER PUBLICATIONS

Extended European Search Report dated Dec. 13, 2023; European Appln. No. 21869748.0-1208 / 4181499 PCT/KR2021012701.

* cited by examiner

ELECTRONIC DEVICE INCLUDING CAMERA MODULE

TECHNICAL FIELD

This application is based on and claims priority under 35 U.S.C. § 119(a) of a Korean patent application number 10-2020-0120609, filed on Sep. 18, 2020, in the Korean Intellectual Property Office, the disclosure of which is incorporated by reference herein in its entirety.

The disclosure relates to an electronic device including a camera module. More particularly, the disclosure relates to a camera module located on a display and an electronic device including the camera module.

BACKGROUND ART

An electronic device may include a display module and a camera module. The display module may be configured such that contents are displayed on part of a surface of the electronic device. The camera module may be configured to take an image of a subject by receiving external light reflected from the subject through part of the surface of the electronic device. A recent camera module may include an under display camera (UDC) module configured to receive external light through a camera area overlapping an area on which contents are displayed by a display module.

A foldable electronic device may include a flexible display, a partial area of which is deformable to be flat or curved when the housing of the foldable electronic device is folded or unfolded. A slidable electronic device may include a flexible display, a partial area of which is deformable to be flat or curved when part of the housing of the slidable electronic device slides.

The above information is presented as background information only to assist with an understanding of the disclosure. No determination has been made, and no assertion is made, as to whether any of the above might be applicable as prior art with regard to the disclosure.

DISCLOSURE

Technical Problem

A display may include a display area for displaying contents and a camera area at least partially overlapping the display area. An under display camera module may receive light through the camera area of the display. For example, the camera area may have a lower pixel density than the other areas of the display area. Accordingly, as the camera area is increased, an area having a low pixel density may be increased, and therefore the quality of an image displayed may be deteriorated.

Furthermore, the length or position of a flexible display may be changed depending on a change in the shape of an electronic device. Alternatively, as time passes or temperature changes, the relative positions of the display and a camera module may vary, and a camera area and the camera module may not be aligned with each other. Based on the misalignment of the camera module and the camera area, a wider camera area may be required. Therefore, the quality of an image displayed on the display may be relatively deteriorated.

Aspects of the disclosure are to address at least the above-mentioned problems and/or disadvantages and to provide at least the advantages described below. Accordingly, an aspect of the disclosure is to provide an electronic device for improving image quality by decreasing the area of a camera area.

Another aspect of the disclosure is to provide a foldable electronic device and/or a slidable electronic device including an under display camera module for maintaining alignment of a camera area and a camera module despite deformation of a flexible display.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a plate structure, a display that is disposed on the plate structure and that includes a plurality of layers including a cover layer that forms part of a surface of the housing and a panel layer including a light emitting element, and a camera module including a lens assembly including a plurality of lenses, at least part of the camera module being located in a space formed in the plate structure, and the camera module being coupled to the display such that an extension line of an optical axis passes through the panel layer and the cover layer. The panel layer includes a first area including a field of view (FOV) of the camera module and a second area around the first area, and the number of light emitting elements per unit area of the first area is smaller than the number of light emitting elements per unit area of the second area.

In accordance with another aspect of the disclosure, an electronic device is provided. The electronic device includes a first housing including a first plate structure, a second housing including a second plate structure, a hinge structure that rotates the first housing and the second housing about a folding axis such that the first plate structure and the second plate structure face the same direction or form a predetermined angle therebetween, a display including a first flat area disposed on at least part of the first plate structure, a second flat area disposed on at least part of the second plate structure, and a folding area formed between the first flat area and the second flat area and deformable to be flat or curved, and a camera module coupled to the display such that an optical axis of a lens passes through a pixel array included in the display. The first plate structure and/or the second plate structure has an opening formed therein in which at least part of the camera module is accommodated.

In accordance with another aspect of the disclosure, an electronic device is provided. The electronic device includes a first structure, a second structure slidably coupled to the first structure, in which at least part of the second structure surrounds the first structure, a cover that is coupled to the first structure and that forms at least part of a rear surface of the electronic device, a display that is disposed on the second structure to move together with the second structure and that includes a first area that forms a front surface of the electronic device and a second area flexibly extending from the first area, at least part of the second area being accommodated in a space between the first structure and the cover, and a camera module coupled to the second structure or the display to move together with the second structure and the display, in which an optical axis of a lens of the camera module passes through a pixel array of the display. The electronic device includes a first state in which the second area is accommodated between the cover and the first structure and a second state in which at least part of the second area forms the front surface together with the first area.

Advantageous Effects

According to the embodiments of the disclosure, the area of the camera area included in the display may be reduced by decreasing the air gap between the camera module and the display. Accordingly, the quality of an image displayed through the display may be improved.

According to the various embodiments of the disclosure, the electronic devices may be configured to maintain the alignment of the camera area included in the display and the camera module located on the display.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
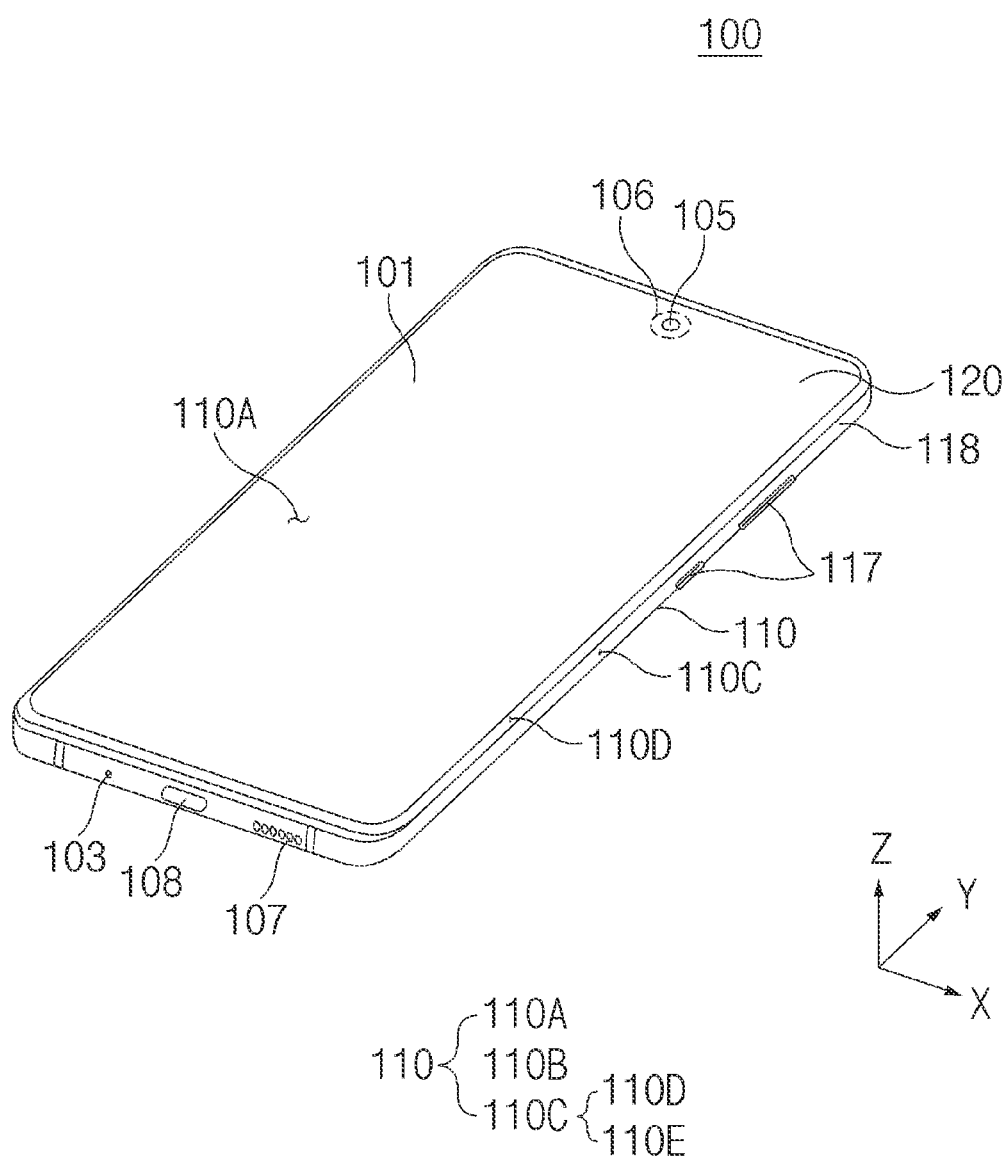
FIG. 1 is a front perspective view of an electronic device according to an embodiment of the disclosure.
Figure 2:
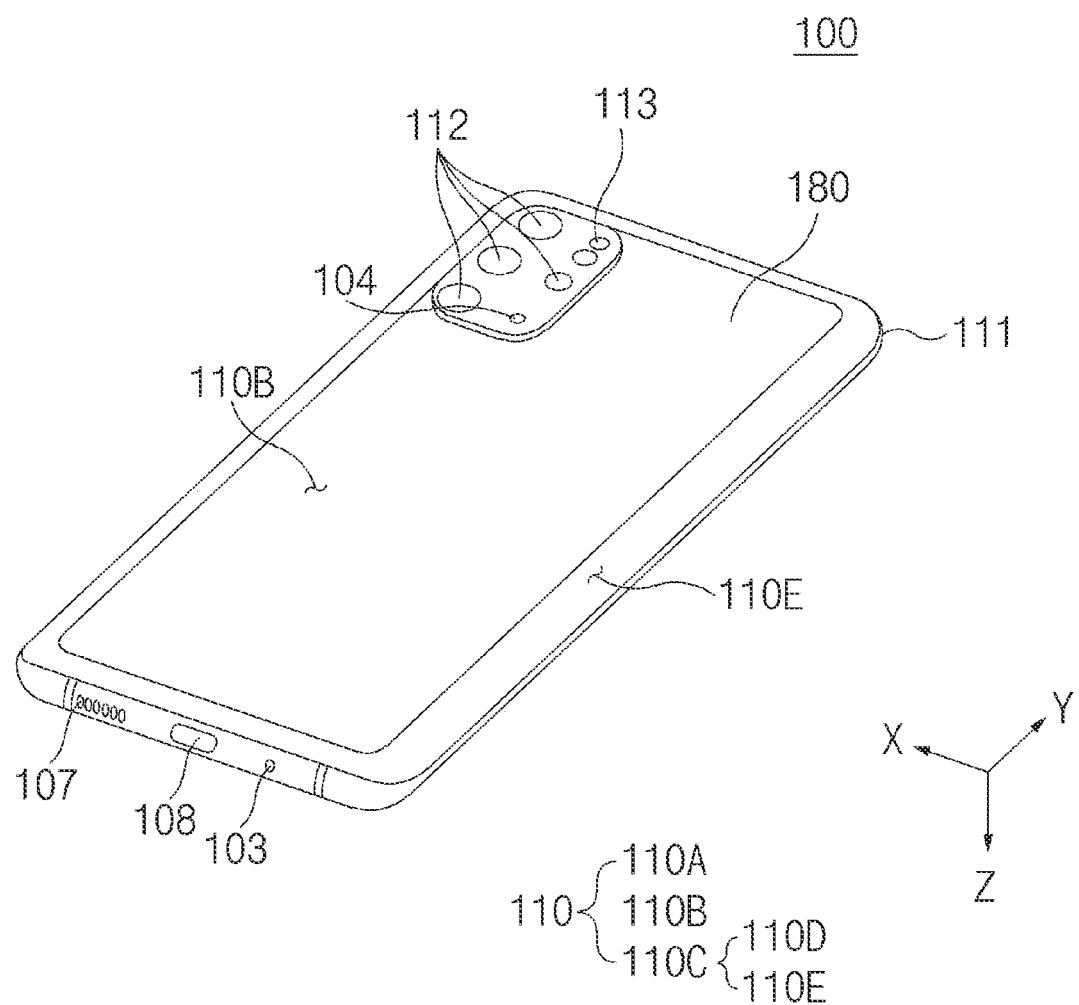
FIG. 2 is a rear perspective view of an electronic device according to an embodiment of the disclosure.

FIG. 1 is a front perspective view of an electronic device according to an embodiment of the disclosure. FIG. 2 is a rear perspective view of an electronic device according to an embodiment of the disclosure.

Referring to FIGS. 1 and 2, the electronic device 100 may include a housing 110 that includes a first surface 101 (or, a front surface) 110A, a second surface (or, a rear surface) 110B, and a side surface 110C surrounding a space between the first surface 110A and the second surface 110B.

In another embodiment (not illustrated) of the disclosure, the housing 110 may refer to a structure that forms some of the first surface 110A, the second surface 110B, and the side surface 110C.

In an embodiment of the disclosure, the first surface 110A may be formed by a front plate 120, at least part of which is substantially transparent (e.g., a glass plate including various coating layers, or a polymer plate). The second surface 110B may be formed by a back plate 180 that is substantially opaque. The back plate 180 may be formed of, for example, coated or colored glass, ceramic, polymer, metal (e.g., aluminum, stainless steel (STS), or magnesium), or a combination of at least two of the aforementioned materials. The side surface 110C may be formed by a side bezel structure (or, a "frame structure") 118 and 111 that is coupled with the front plate 120 and the back plate 180 and that contains metal and/or polymer.

In another embodiment of the disclosure, the back plate 180 and the side bezel structure 118 and 111 may be integrally formed with each other and may contain the same material (e.g., a metallic material, such as aluminum).

In the illustrated embodiment of the disclosure, the front plate 120 may include two first areas 110D that curvedly and seamlessly extend from partial areas of the first surface 110A toward the back plate 180. The first areas 110D may be located at opposite long edges of the front plate 120.

In the illustrated embodiment of the disclosure, the back plate 180 may include two second areas 110E that curvedly and seamlessly extend from partial areas of the second surface 110B toward the front plate 120. The second areas 110E may be located at opposite long edges of the back plate 180.

In another embodiment of the disclosure, the front plate 120 (or, the back plate 180) may include only one of the first areas 110D (or, the second areas 110E). Furthermore, in another embodiment of the disclosure, the front plate 120 (or, the back plate 180) may not include a part of the first areas 110D (or, the second areas 110E).

In an embodiment of the disclosure, when viewed from a side of the electronic device 100, the side bezel structure 118 and 111 may have a first thickness (or, width) at sides (e.g., short sides) not including the first areas 110D or the second areas 110E and may have a second thickness at sides (e.g., long sides) including the first areas 110D or the second areas 110E, the second thickness being smaller than the first thickness.

Figure 14:
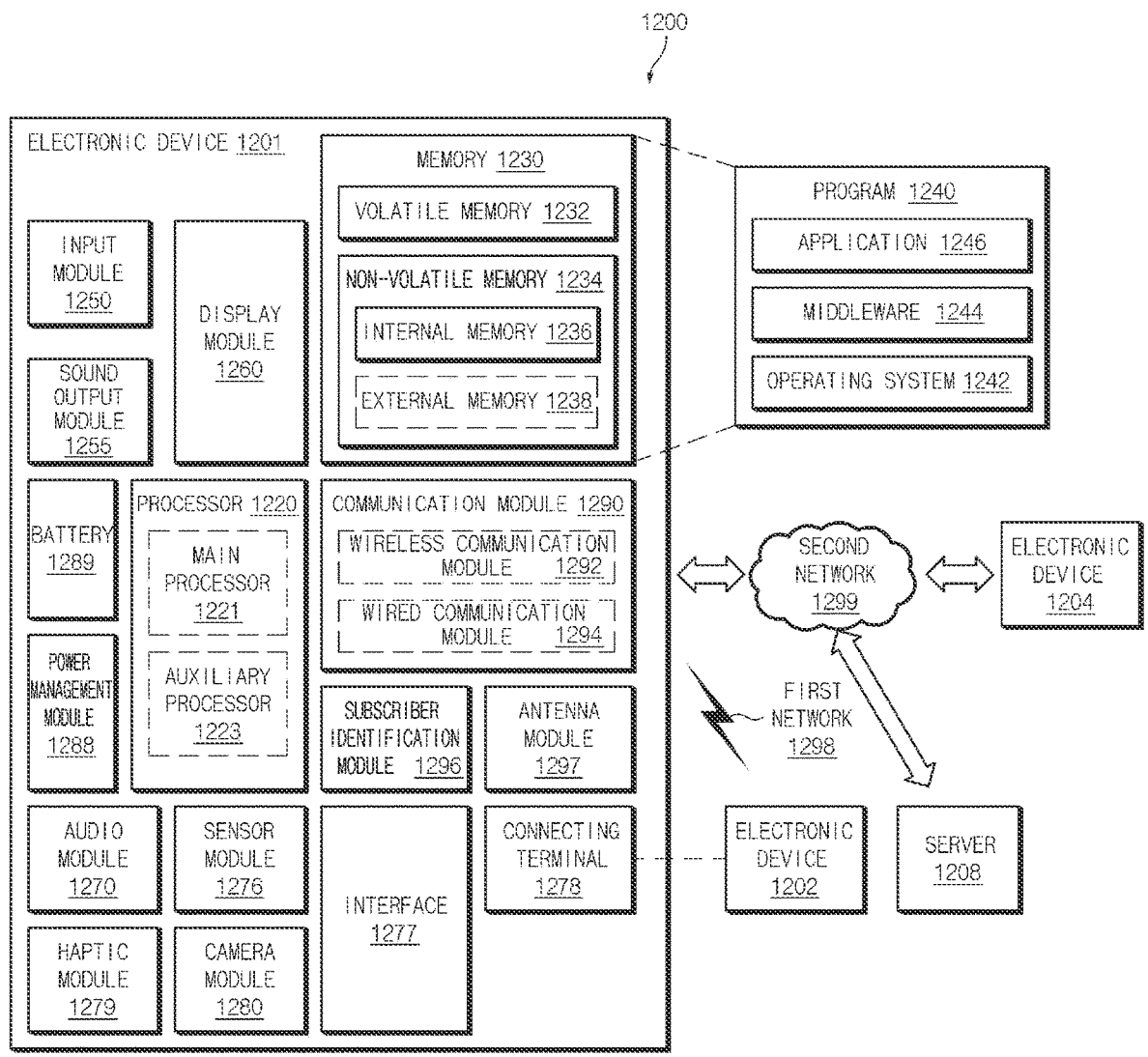
FIG. 14 is a block diagram of an electronic device in a network environment according to an embodiment of the disclosure.

In an embodiment of the disclosure, the electronic device 100 may include at least one of a display 130, an audio module 103, 104, and 107 (e.g., an audio module 1270 of FIG. 14), a sensor module (not illustrated) (e.g., a sensor module 1276 of FIG. 14), camera modules 105 and 112 (e.g., a camera module 1280 of FIG. 14), key input devices 117 (e.g., an input module 1250 of FIG. 14), a light emitting element (not illustrated), or a connector hole 108 (e.g., a connecting terminal 1278 of FIG. 14). In another embodiment of the disclosure, the electronic device 100 may not include at least one component (e.g., the key input devices 117 or the light emitting element (not illustrated)) among the aforementioned components, or may additionally include other component(s).

In an embodiment of the disclosure, the display 130 may be exposed through at least part of the front plate 120. For example, at least part of the display 130 may be exposed through the front plate 120 that includes the first surface 110A and the first areas 110D of the side surface 110C.

In an embodiment of the disclosure, the shape of the display 130 may be substantially the same as the shape of the adjacent outside edge of the front plate 120. In another embodiment (not illustrated), the gap between the periphery of the display 130 and the periphery of the front plate 120 may be substantially constant to expand the area by which the display 130 is exposed.

In an embodiment of the disclosure, a surface of the housing 110 (or, the front plate 120) may include a display area through which the display 130 is visually exposed and on which contents are displayed through pixels. For example, the display area may include the first surface 110A and the first areas 110D of the side surface 110C.

In another embodiment (not illustrated) of the disclosure, the display area 110A and 110D may include a sensing area (not illustrated) configured to obtain biometric information of a user. Here, when the display area 110A and 110D includes the sensing area, this may mean that at least part of the sensing area overlaps the display area 110A and 110D. For example, the sensing area (not illustrated) may refer to an area capable of displaying contents by the display 130 like the other areas of the display area 110A and 110D and additionally obtaining biometric information (e.g., a fingerprint) of the user.

In another embodiment (not illustrated) of the disclosure, the display 130 may include, or may be disposed adjacent to, touch detection circuitry, a pressure sensor for measuring the intensity (pressure) of a touch, and/or a digitizer for detecting a stylus pen of a magnetic field type.

In an embodiment of the disclosure, the audio module 103, 104, and 107 may include the microphone holes 103 and 104 and the speaker hole 107.

In an embodiment of the disclosure, the microphone holes 103 and 104 may include the first microphone hole 103 formed in a partial area of the side surface 110C and the second microphone hole 104 formed in a partial area of the second surface 110B. Microphones for obtaining external sounds may be disposed in the housing 110 to correspond to the microphone holes 103 and 104. The microphones may each include a plurality of microphones to detect the direction of a sound. In an embodiment of the disclosure, the second microphone hole 104 formed in the partial area of the second surface 110B may be disposed adjacent to the camera modules 105 and 112. For example, the second microphone hole 104 may obtain sounds when the camera modules 105 and 112 are executed, or may obtain sounds when other functions are executed.

In an embodiment of the disclosure, the speaker hole 107 may include a receiver hole for telephone call (not illustrated). The speaker hole 107 may be formed in a portion of the side surface 110C of the electronic device 100. In another embodiment of the disclosure, the speaker hole 107, together with the microphone hole 103, may be implemented as a single hole. Although not illustrated, the receiver hole for telephone call (not illustrated) may be formed in another portion of the side surface 110C. For example, the receiver hole for telephone call (not illustrated) may be formed in another portion (e.g., a portion facing the +Y-axis direction) of the side surface 110C that faces the portion (e.g., a portion facing the −Y-axis direction) of the side surface 110C in which the speaker hole 107 is formed.

In an embodiment of the disclosure, the electronic device 100 may include a speaker fluidly connected with the speaker hole 107. In another embodiment of the disclosure, the speaker may include a piezoelectric speaker that does not have the speaker hole 107.

In an embodiment of the disclosure, the sensor module (not illustrated) (e.g., the sensor module 1276 of FIG. 14) may generate an electrical signal or a data value that corresponds to an operational state inside the electronic device 100 or an environmental state external to the electronic device 100. In an embodiment of the disclosure, the sensor module (not illustrated) may be disposed on at least a part of the first surface 110A, the second surface 110B, and the side surface 110C (e.g., the first areas 110D and/or the second areas 110E) of the housing 110 and may be disposed on the rear surface of the display 130. For example, at least part of the sensor module (not illustrated) may be disposed under the screen display area 110A and 110 and may not be visually exposed, and the sensing area (not illustrated) may be formed in at least part of the screen display area 110A and 110D. For example, the sensor module (not illustrated) may include an optical fingerprint sensor. In some embodiments (not illustrated) of the disclosure, the fingerprint sensor may be disposed on the second surface 110B as well as the first surface 110A of the housing 110 (e.g., the screen display area 110A and 110D). For example, the sensor module may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment of the disclosure, the key input devices 117 may be disposed on the side surface 110C (e.g., the first areas 110D and/or the second areas 110E) of the housing 110. In another embodiment of the disclosure, the electronic device 100 may not include all or some of the key input devices 117, and the key input devices 117 not included may be implemented in a different form, such as a soft key, on the display 130. In another embodiment of the disclosure, the key input devices 117 may include a sensor module (not illustrated) that forms the sensing area (not illustrated) that is included in the display area 110A and 110D.

In an embodiment of the disclosure, the connector hole 108 may accommodate a connector. The connector hole 108 may be disposed in the side surface 110C of the housing 110. For example, the connector hole 108 may be disposed in the side surface 110c so as to be adjacent to at least part of the audio module (e.g., the microphone hole 103 and the speaker hole 107). In another embodiment of the disclosure, the electronic device 100 may include the first connector hole 108 that accommodates a connector (e.g., a universal serial bus (USB) connector) for transmitting/receiving power and/or data with an external electronic device, and/or a second connector hole (not illustrated) that accommodates a connector (e.g., an earphone jack) for transmitting/receiving audio signals with an external electronic device.

In an embodiment of the disclosure, the electronic device 100 may include the light emitting element (not illustrated). For example, the light emitting element (not illustrated) may be disposed on the first surface 110A of the housing 110. The light emitting element (not illustrated) may provide state information of the electronic device 100 in the form of light. In another embodiment of the disclosure, the light emitting element (not illustrated) may provide a light source that operates in conjunction with the camera module 105. For example, the light emitting element (not illustrated) may include a light emitting diode (LED), an IR LED, and/or a xenon lamp.

In an embodiment of the disclosure, the camera modules 105 and 112 may include the first camera module 105 (e.g., an under display camera) configured to receive light through a camera area 106 of the first surface 110A of the electronic device 100, the second camera module 112 exposed on the second surface 110B, and/or a flash 113.

In an embodiment of the disclosure, the first camera module 105 may be disposed on the rear surface of the display 130. For example, the first camera module 105 may be coupled to some layers of the display 130, or may be located in an internal structure of the housing 110 such that the optical axis (e.g., an optical axis L of FIGS. 10 to 12) of a lens is aligned with the camera area 106.

In an embodiment of the disclosure, the first camera module 105 may receive light through the camera area 106 formed in at least part of the display area 110A and 110D. At least part of the camera area 106 may be included in the display area 110A and 110D. When the camera area 106 is included in the display area 110A and 110D, this may mean that at least part of the camera area 106 overlaps the display area 110A and 110D. For example, when the first camera module 105 does not operate, the camera area 106 may display contents like the other areas of the display area. For example, when the first camera module 105 operates, the camera area 106 may not display contents, and light incident on the first camera module 105 may pass through the camera area 106.

In an embodiment of the disclosure, an optical signal input through the camera area 106 may pass through a pixel array (e.g., a panel layer 520 of FIG. 10) of the display 130 and the lens of the first camera module 105 and may be received by an image sensor (e.g., an image sensor 426 of FIG. 10) of the first camera module 105. For example, the first camera module 105 may include an under display camera (UDC).

In an embodiment of the disclosure, the second camera module 112 may include a plurality of camera modules (e.g., a dual camera, a triple camera, or a quad camera). However, the second camera module 112 is not necessarily limited to including the plurality of camera modules and may include one camera module.

The first camera module 105 and/or the second module 112 may include one or more lenses, an image sensor, and/or an image signal processor. The flash 113 may include, for example, a light emitting diode or a xenon lamp. In another embodiment of the disclosure, two or more lenses (an infrared camera lens, a wide angle lens, and a telephoto lens) and image sensors may be disposed in the housing 110 to face toward one surface (e.g., the second surface 110B) of the electronic device 100.

Figure 3:
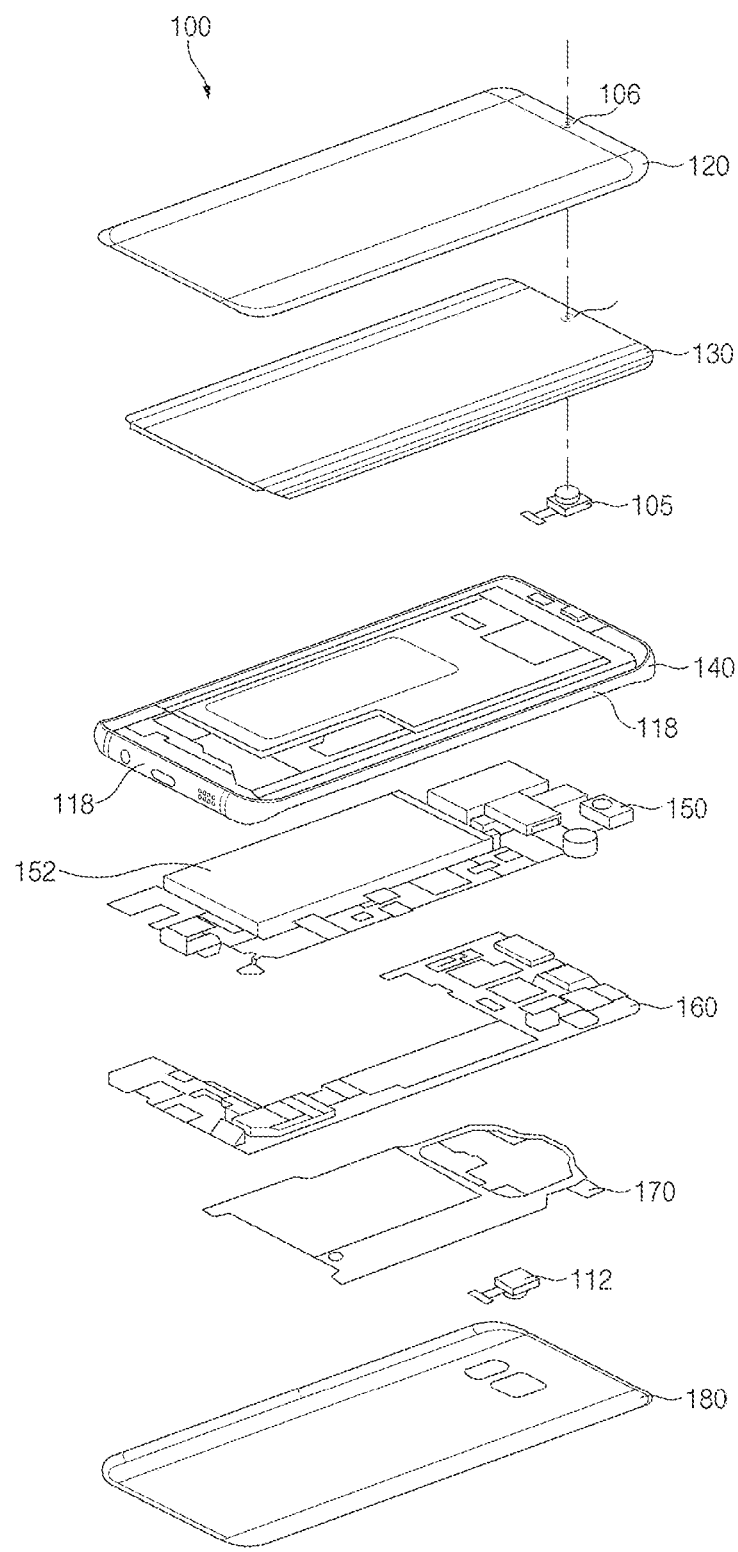
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 100 may include the side bezel structure 118, a first support member 140 (e.g., a bracket), the front plate 120, the display 130, a printed circuit board (PCB) 150 (e.g., a rigid PCB, a flexible PCB (FPCB), or a rigid-flexible PCB (RFPCB)), a battery 152, a second support member 160 (e.g., a rear case), an antenna 170, and the back plate 180. In some embodiments of the disclosure, the electronic device 100 may not include at least one component (e.g., the first support member 140 or the second support member 160) among the aforementioned components, or may additionally include other component(s). At least one of the components of the electronic device 100 may be the same as, or similar to, at least one of the components of the electronic device 100 of FIG. 1 or 2, and repetitive descriptions will hereinafter be omitted.

In an embodiment of the disclosure, the first support member 140 may be disposed inside the electronic device 100 and may be connected with the side bezel structure 118, or may be integrally formed with the side bezel structure 118. The first support member 140 may be formed of, for example, a metallic material and/or a nonmetallic (e.g., polymer) material. The display 130 may be coupled to, or located on, one surface of the first support member 140, and the printed circuit board 150 may be coupled to, or located on, an opposite surface of the first support member 140.

In an embodiment of the disclosure, a processor, a memory, and/or an interface may be disposed on the printed circuit board 150. The processor may include, for example, one or more of a central processing unit, an application processor, a graphic processing unit, an image signal processor, a sensor hub processor, or a communication processor.

In an embodiment of the disclosure, the memory may include, for example, volatile memory or nonvolatile memory.

In an embodiment of the disclosure, the interface may include, for example, a high definition multimedia interface (HDMI), a universal serial bus (USB) interface, a secure digital (SD) card interface, and/or an audio interface. For example, the interface may electrically or physically connect the electronic device 100 with an external electronic device and may include a USB connector, an SD card/multimedia card (MMC) connector, or an audio connector.

In an embodiment of the disclosure, the battery 152 may supply power to at least one component of the electronic device 100. The battery 152 may include, for example, a primary cell that is not rechargeable, a secondary cell that is rechargeable, or a fuel cell. For example, at least part of the battery 152 may be disposed on substantially the same plane as the printed circuit board 150. The battery 152 may be integrally disposed inside the electronic device 100, or may be disposed so as to be detachable from the electronic device 100.

In an embodiment of the disclosure, the antenna 170 may be disposed between the back plate 180 and the battery 152. The antenna 170 may include, for example, a near field communication (NFC) antenna, a wireless charging antenna, and/or a magnetic secure transmission (MST) antenna. For example, the antenna 170 may perform short-range communication with an external device, or may wirelessly transmit and receive power required for charging. In another embodiment of the disclosure, an antenna structure may be formed by part of the side bezel structure 118 and 111 and/or part of the first support member 140, or a combination thereof.

In an embodiment of the disclosure, the first camera module 105 may be coupled to the rear surface of the display 130 such that the camera area 106 is formed in the front plate 120. For example, at least part of the first camera module 105 may be disposed on the first support member 140. In various embodiments of the disclosure, at least part of the first camera module 105 may be located in an opening 149 formed in the first support member 140. For example, the lens of the first camera module 105 may be disposed to receive light passing through the pixel array (e.g., the panel layer 520 of FIG. 10) included in the display 130, and the camera area 106 may at least partially overlap the display area on which contents are displayed. For example, the optical axis of the first camera module 105 may pass through at least a partial area of the display 130. For example, the at least a partial area may include a pixel array (e.g., the panel layer 520 of FIG. 10). In an embodiment of the disclosure, the first camera module 105 may receive light passing through the camera area 106 and the pixel array (e.g., the panel layer 520 of FIG. 10) of the display 130.

In an embodiment of the disclosure, the second camera module 112 may be disposed such that a lens is exposed through a second camera area 184 of the back plate 180 (e.g., the rear surface 110B of FIG. 2) of the electronic device 100. The second camera area 184 may be formed in at least part of a surface (e.g., the rear surface 110B of FIG. 2) of the back plate 180. In an embodiment of the disclosure, the second camera area 184 may be at least partially transparent such that external light is incident on the lens of the second camera module 112.

In an embodiment of the disclosure, at least part of the second camera area 184 may protrude from the surface of the back plate 180 to a predetermined height. However, without being necessarily limited thereto, the second camera area 184 may form substantially the same plane as the surface of the back plate 180.

Figure 4:
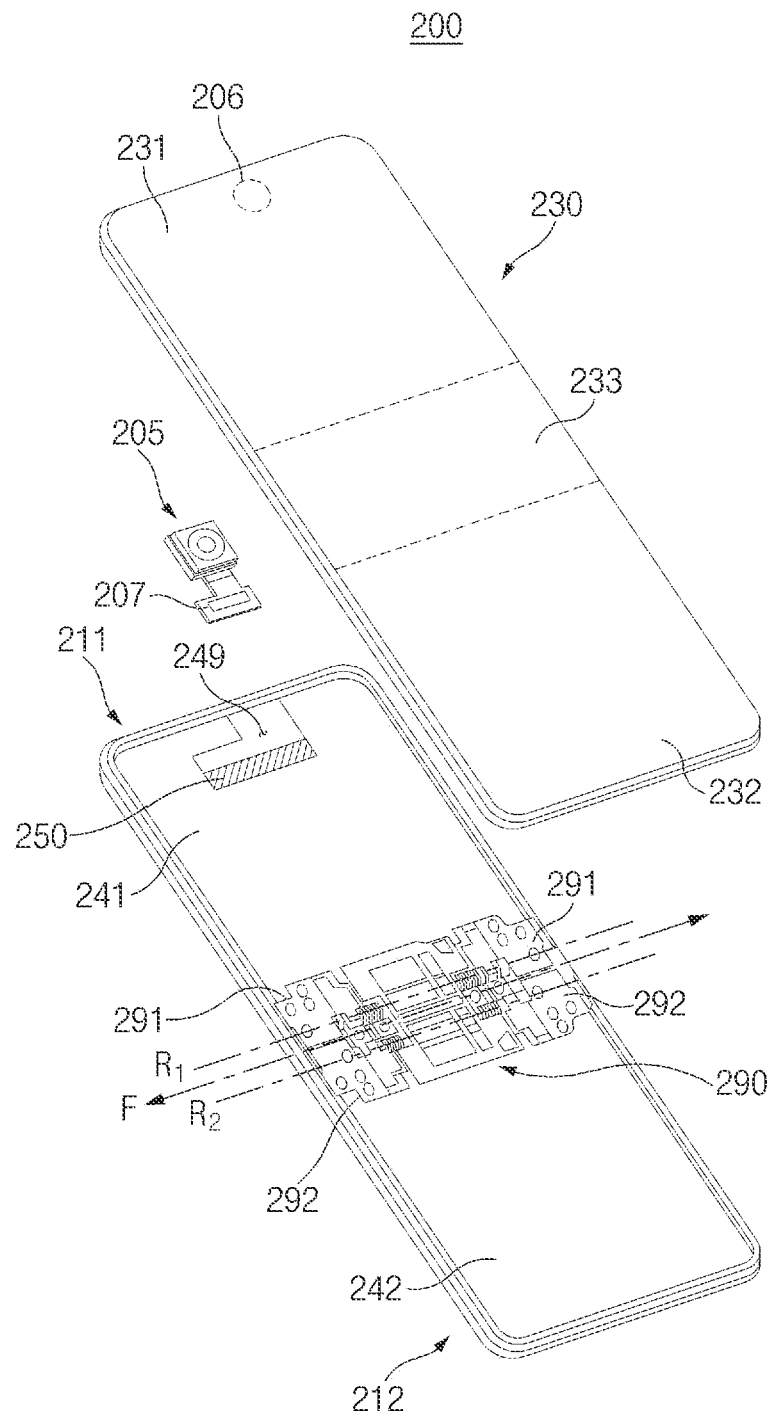
FIG. 4 is an exploded perspective view of a foldable electronic device according to an embodiment of the disclosure.

FIG. 4 is an exploded perspective view of a foldable electronic device according to an embodiment of the disclosure.

Referring to FIG. 4, the foldable electronic device 200 (hereinafter, referred to as the electronic device) according to the illustrated embodiment may include a flat state (e.g., FIG. 5) in which a flexible display 230 is substantially flat and a folded state (e.g., FIG. 6) in which a partial area of the flexible display 230 is curved.

In an embodiment of the disclosure, the electronic device 200 may include a first housing 211, a second housing 212, a hinge structure 290, the flexible display 230, and a camera module 205 (e.g., the camera module 105 of FIGS. 1 to 3).

In an embodiment of the disclosure, the first housing 211 and/or the second housing 212 may form an inner space in which various electronic parts are disposed. In an embodiment of the disclosure, the first housing 211 and the second housing 212 may be folded or unfolded with a folding axis F therebetween. In an embodiment of the disclosure, the first housing 211 may include a first plate structure 241 on which at least part of a first flat area 231 of the flexible display 230 is disposed. In an embodiment of the disclosure, the second housing 212 may include a second plate structure 242 on which at least part of a second flat area 232 of the flexible display 232 is disposed.

In an embodiment of the disclosure, the flexible display 230 may form one surface of the first housing 211 and one surface of the second housing 212. In an embodiment of the disclosure, the flexible display 230 may include the first flat area 231 and the second flat area 232 formed to be substantially flat and a folding area 233 deformable to be flat or curved.

In an embodiment of the disclosure, the first flat area 231 may be disposed on at least a partial area of the first plate structure 241. For example, the first flat area 231 may be attached to the first plate structure 241 and may thus remain flat when the electronic device 200 is folded or unfolded.

In an embodiment of the disclosure, the second flat area 232 may be disposed on at least a partial area of the second plate structure 242. For example, the second flat area 232 may be attached to the second plate structure 242 and may thus remain flat when the electronic device 200 is folded or unfolded.

In an embodiment of the disclosure, the folding area 233 may be formed between the first flat area 231 and the second flat area 232, and at least part of the folding area 233 may be disposed over the hinge structure 290. The folding area 233 may be curved in the folded state and may be flat in the flat state.

In an embodiment of the disclosure, the hinge structure 290 may connect the first housing 211 and the second housing 212 such that the first housing 211 and the second housing 212 are folded with the folding axis F therebetween. In an embodiment of the disclosure, the hinge structure 290 may be connected with the first plate structure 241 of the first housing 211 and the second plate structure 242 of the second housing 212 to allow the first housing 211 and the second housing 212 to be folded or unfolded with the folding axis F therebetween. In an embodiment of the disclosure, at least part of the hinge structure 290 may be disposed in a hinge housing (e.g., the hinge housing 213 of FIG. 6).

In an embodiment of the disclosure, the hinge structure 290 may include a first axis of rotation R1, a second axis of rotation R2, a first rotary part 291, and a second rotary part 292.

In an embodiment of the disclosure, the first rotary part 291 may rotate about the first axis of rotation R1. The first rotary part 291 may be connected to the first support plate 241 of the first housing 211. In an embodiment of the disclosure, the second rotary part 292 may rotate about the second axis of rotation R2. The second rotary part 292 may be connected to the second plate structure 242 of the second housing 212. In an embodiment of the disclosure, the first axis of rotation R1 and the second axis of rotation R2 may be substantially parallel to the folding axis F and may be symmetric to each other with respect to the folding axis F.

In an embodiment of the disclosure, when the electronic device 200 is folded or unfolded, the first housing 211, together with the first rotary part 291, may rotate about the first axis of rotation R1 by a predetermined angle, and the second housing 212, together with the second rotary part 292, may rotate about the second axis of rotation R2 by the predetermined angle. For example, the first housing 211 and the second housing 212 may be folded with the folding axis F therebetween.

In an embodiment of the disclosure, the camera module 205 may be disposed on the rear surface of the flexible display 230 such that a lens is aligned with a camera area 206 of the flexible display 230. For example, the camera module 205 may be disposed such that to receive external light, the optical axis (e.g., the optical axis L of FIGS. 10 to 12) of the lens passes through at least some layers (e.g., the panel layer 520 of FIG. 10) of the flexible display 230. For example, the camera module 205 may be attached to the rear surface of the flexible display 230. In another embodiment of the disclosure, the camera module 205 may be disposed on the first plate structure 241 of the first housing 211 and the second plate structure 242 of the second housing 212.

In an embodiment of the disclosure, the first plate structure 241 and/or the second plate structure 242 may have an opening 249 formed therein in which at least part of the camera module 205 is accommodated. For example, the opening 249 may be formed through the first plate structure 241 or the second plate structure 242, or may be formed as a recess on the first plate structure 241 or the second plate structure 242.

In an embodiment of the disclosure, the flexible display 230 may be disposed on one surface of the first plate structure 241 or the second plate structure 242, and a printed circuit board 250 may be disposed on an opposite surface of the first plate structure 241 or the second plate structure 242. The camera module 205 may include a connector 207 extending to the printed circuit board 250 through the opening 249.

In an embodiment of the disclosure, the flexible display 230 may form, on a surface of the electronic device 200, a display area on which contents are displayed. The camera area 206 may be formed in a portion of the display area.

In an embodiment of the disclosure, the camera module 205 may receive light through the camera area 206 formed in the display area. The camera area 206 may be included in the display area. When the camera area 206 is included in the display area, this may mean that at least part of the camera area 206 overlaps the display area. For example, when the camera module 205 does not operate, the camera area 206 may display contents together with the other areas of the display area. For example, when the camera module 205 operates (e.g., a photographing mode), the camera area 206 may display different contents from the other areas of the display area, or light incident on the camera module 205 may pass through the camera area 206. In another example, when the camera module 205 operates (e.g., a photographing mode), power may not be supplied to the camera area 206. For example, pixels included in the camera area 206 may not emit light.

In an embodiment of the disclosure, an optical signal input through the camera area 206 may pass through a pixel array (e.g., the panel layer 520 of FIG. 10) of the flexible display 230 and the lens of the first camera module 205 and may be received by an image sensor of the camera module 205. For example, the camera module 205 may include an under display camera (UDC).

Figure 5:
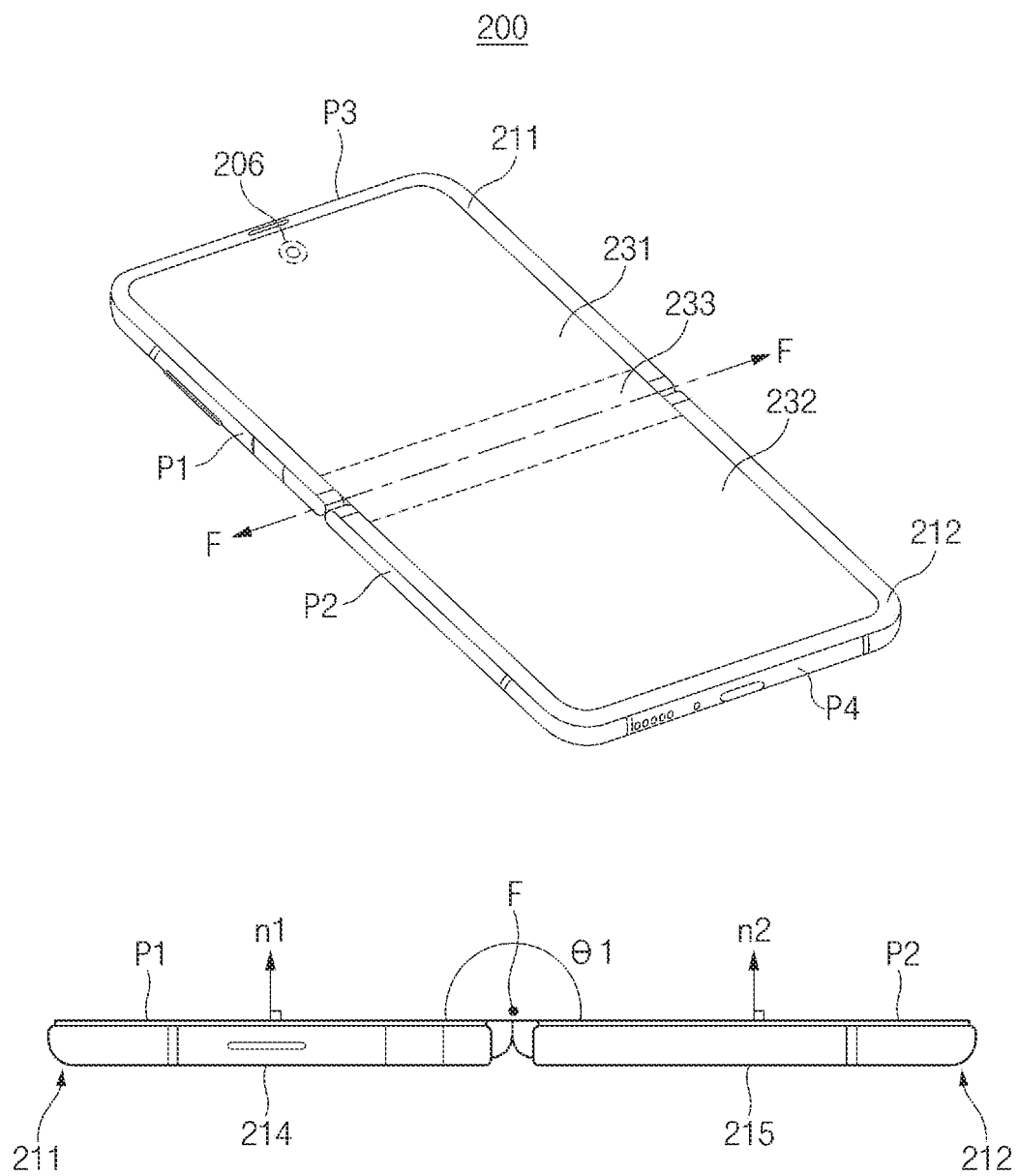
FIG. 5 is a view illustrating a flat state of a foldable electronic device according to an embodiment of the disclosure.
Figure 6:
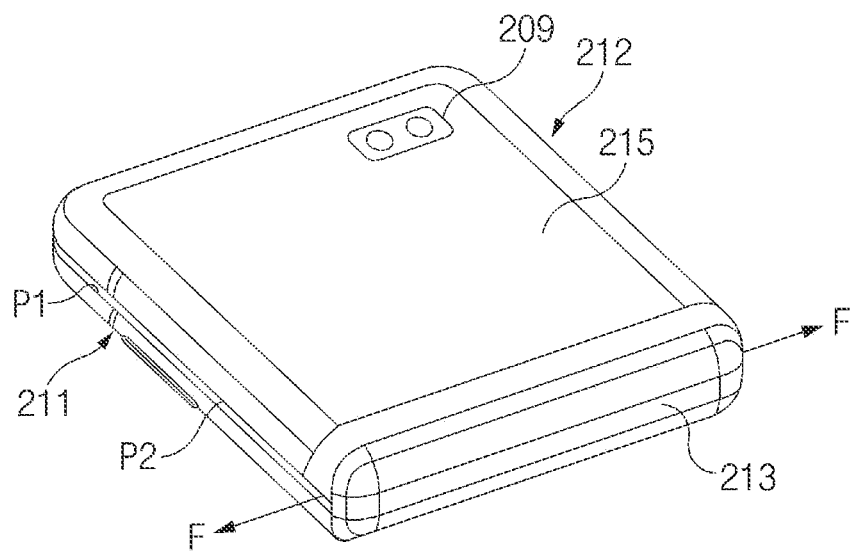
FIG. 6 is a view illustrating a folded state of a foldable electronic device according to an embodiment of the disclosure.
Figure 6:
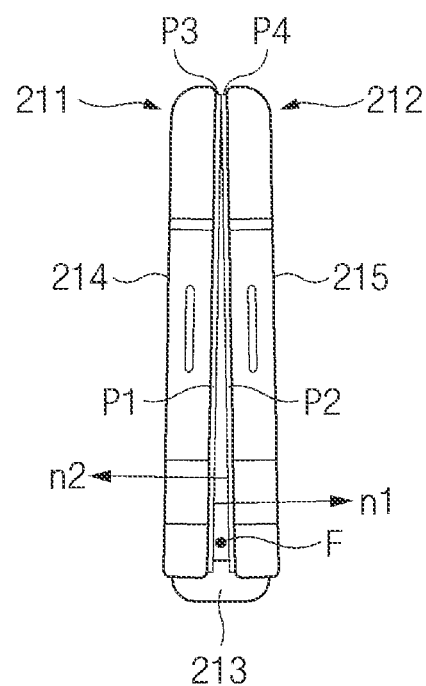

FIG. 5 is a view illustrating a flat state of a foldable electronic device according to an embodiment of the disclosure. FIG. 6 is a view illustrating a folded state of a foldable electronic device according to an embodiment of the disclosure.

Referring to FIG. 5, in the flat state, the first housing 211 and the second housing 212 may be parallel to each other to form substantially the same plane. For example, the first housing 211 may include a first edge P1 substantially perpendicular to the folding axis F. For example, the second housing 212 may include a second edge P2 substantially perpendicular to the folding axis F. In the flat state, the first edge P1 and the second edge P2 may form a first angle θ1 (e.g., about 180 degrees) therebetween.

Referring to FIG. 5, in the flat state, the folding area 233 of the flexible display 230 may be substantially flat. The folding area 233 may form substantially the same continuous plane together with the first flat area 231 and the second flat area 232. For example, the normal vector n1 of the first flat area 231 may be substantially parallel to the normal vector n2 of the second flat area 232.

Referring to FIG. 6, in the folded state, the first housing 211 and the second housing 212 may form a predetermined angle therebetween. For example, the first housing 211 and the second housing 212 may be disposed such that the first edge P1 and the second edge P2 form a predetermined angle therebetween.

Referring to FIG. 6, in the folded state, the folding area 233 of the flexible display 230 may be curved. The folding area 233 may have a predetermined curvature. For example, the normal vector n1 of the first flat area 231 may form a predetermined angle with the normal vector n2 of the second flat area 232.

In an embodiment of the disclosure, the first housing 211 may include a third edge P3 substantially parallel to the folding axis F. For example, the second housing 212 may include a fourth edge P4 substantially parallel to the folding axis F.

For example, referring to FIG. 6, the folded state may include a fully folded state in which the third edge P3 of the first housing 211 makes contact with the fourth edge P4 of the second housing 212. In the fully folded state, the first edge P1 and the second edge P2 may be substantially parallel to each other, or an extension line of the first edge P1 and an extension line of the second edge P2 may intersect each other.

In various embodiments of the disclosure, the fully folded state may include a state in which the space surrounded by the first housing 211, the second housing 212, and the hinge housing 213 is closed when the electronic device 100 is viewed from one side. For example, a shock-absorbing member (not illustrated) may be disposed at the third edge P3 and/or the fourth edge P4, and the fully folded state may include a state in which a closed space is formed by contact of the shock-absorbing member with the first housing 211 or the second housing 212.

In an embodiment of the disclosure, the first housing 211 may include a first cover 214. The second housing 212 may include a second cover 215. The first cover 214 and the second cover 215 may form at least part of a surface of the electronic device 200. For example, in the flat state, the first cover 214 and the second cover 215 may form at least part of the rear surface of the electronic device 200. The second cover 215 may have a rear camera area 209 formed therein through which a second camera module (e.g., the second camera module 112 of FIGS. 2 and 3) disposed inside the electronic device 200 is visually exposed. The second camera module may receive light through the rear camera area 209.

Figure 7:
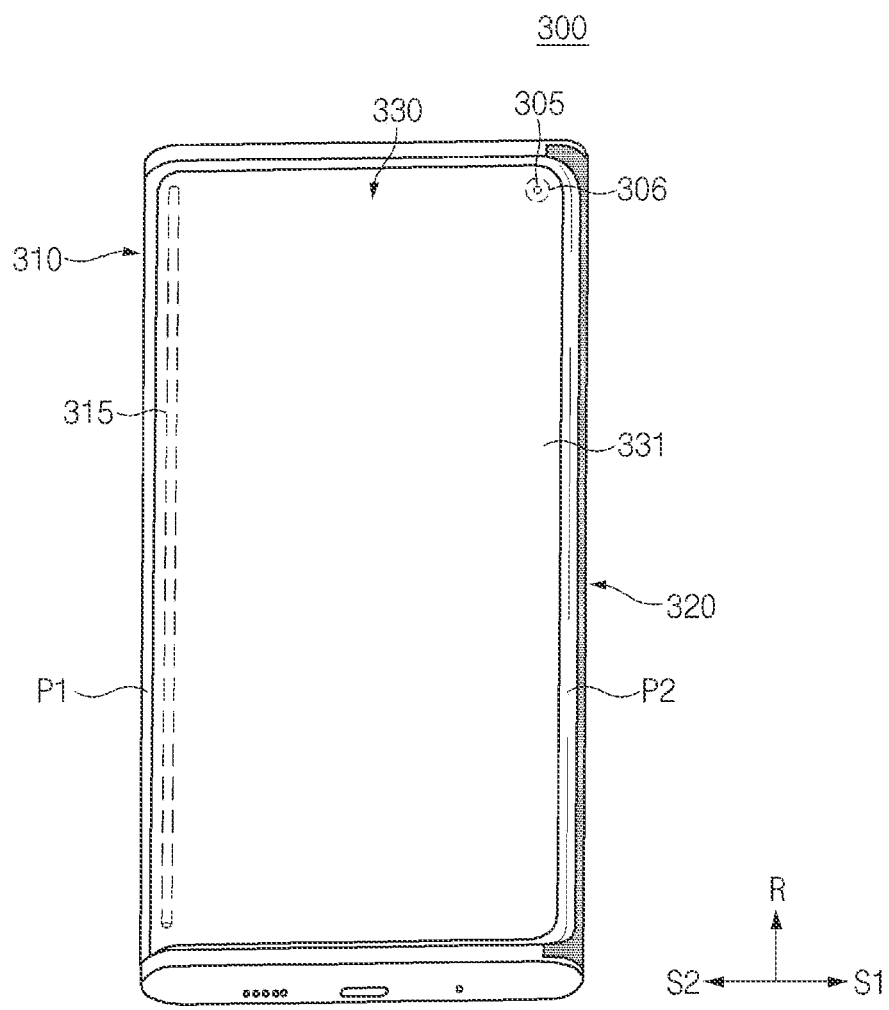
FIG. 7 is a view illustrating a first state of a slidable electronic device according to an embodiment of the disclosure.
Figure 7:
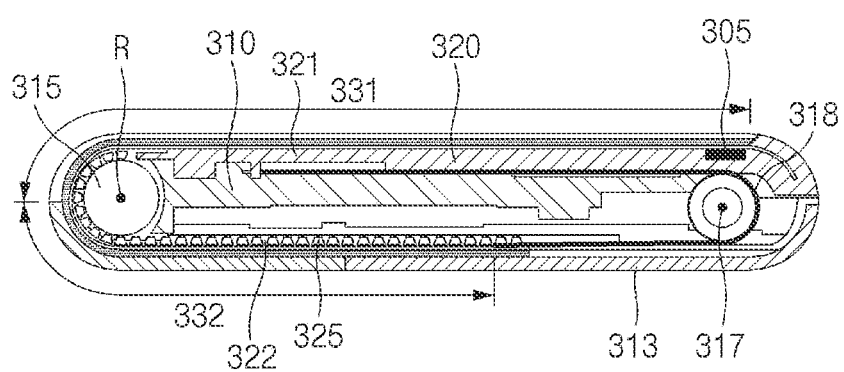
Figure 8:
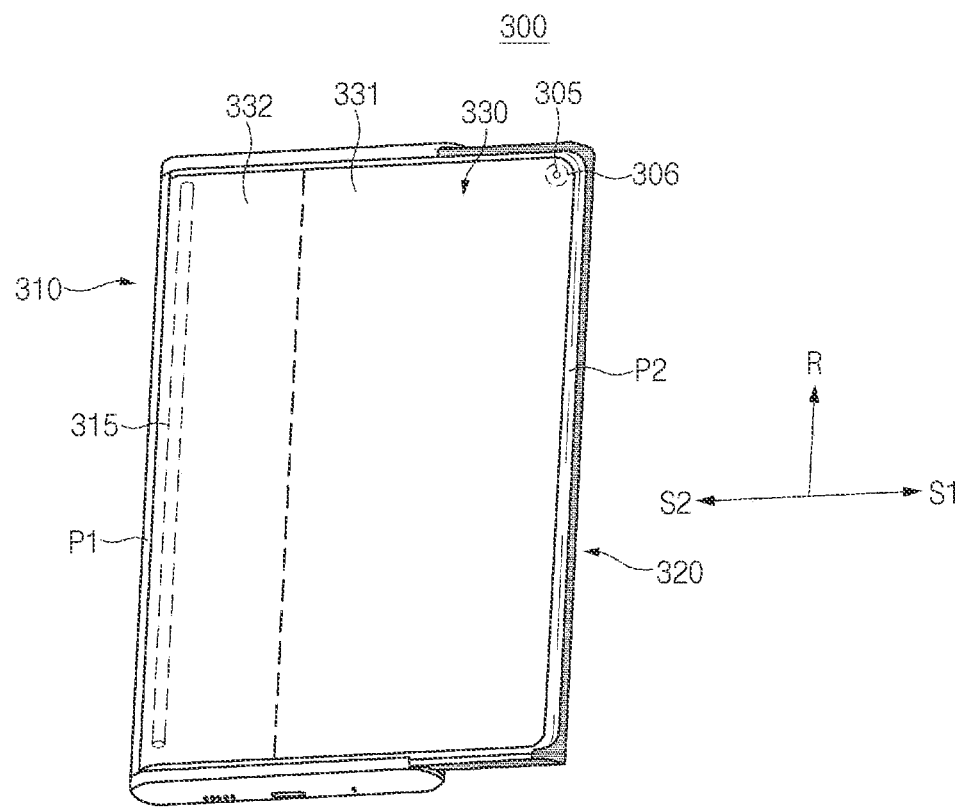
FIG. 8 is a view illustrating a second state of a slidable electronic device according to an embodiment of the disclosure.
Figure 8:
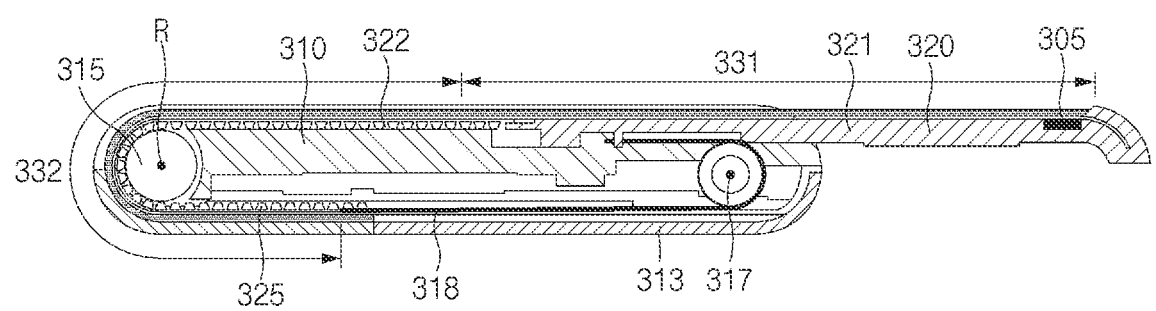
Figure 9:
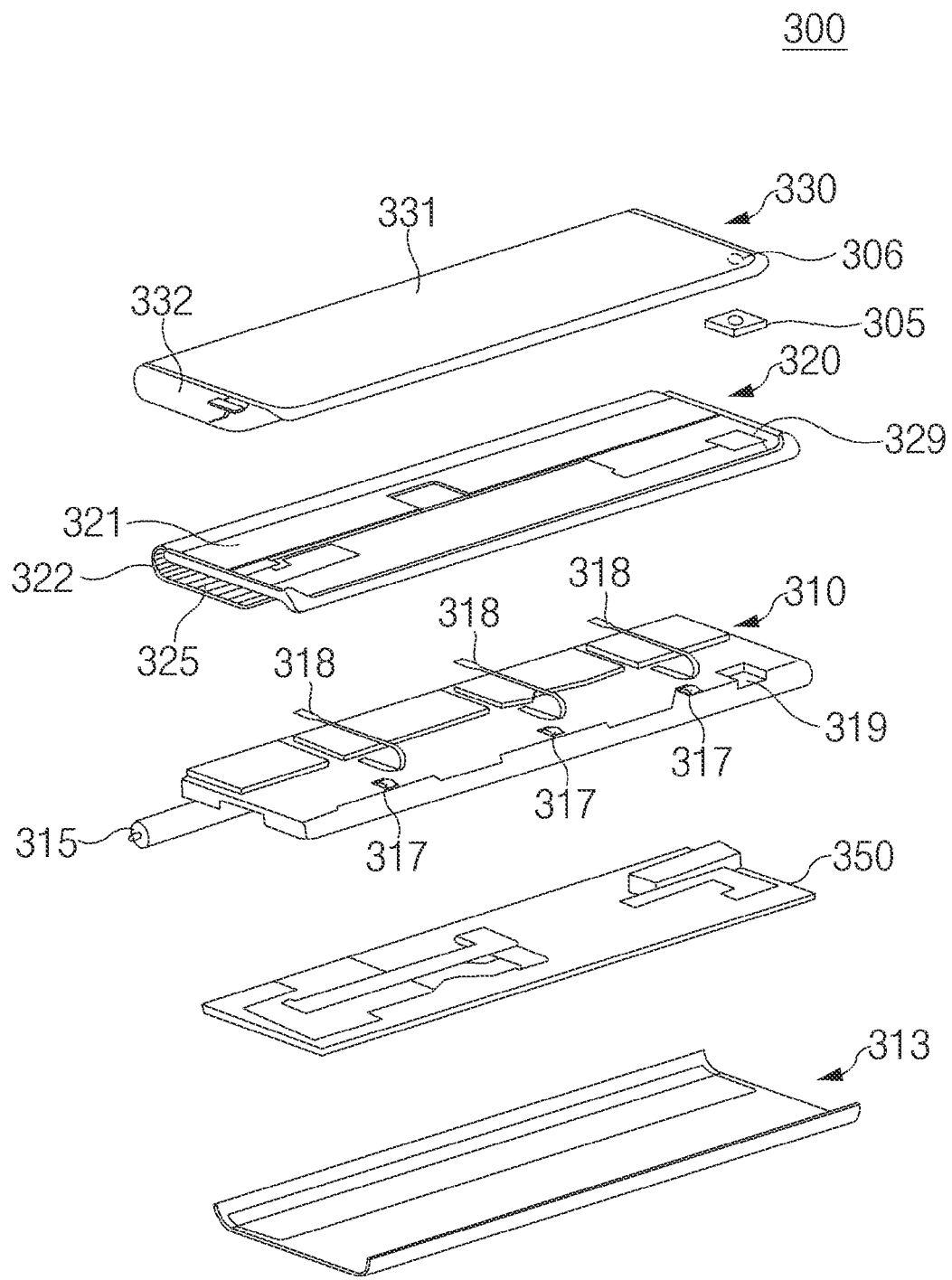
FIG. 9 is an exploded perspective view of a slidable electronic device according to an embodiment of the disclosure.

FIG. 7 is a view illustrating a first state of a slidable electronic device according to an embodiment of the disclosure. FIG. 8 is a view illustrating a second state of a slidable electronic device according to an embodiment of the disclosure. FIG. 9 is an exploded perspective view of a slidable electronic device according to an embodiment of the disclosure.

In an embodiment of the disclosure, the slidable electronic device 300 (hereinafter, referred to as the electronic device) may include the first state illustrated in FIG. 7 and the second state illustrated in FIG. 8. For example, the first state and the second state may be determined depending on the position of a second structure 320 relative to a first structure 310. For example, a display area of the electronic device 300 may be wider in the second state than in the first state.

In various embodiments of the disclosure, a visually exposed area of the flexible display 330 may be wider in the second state than in the first state. For example, the first state may include a state in which the flexible display 330 is retracted, and the second state may include a state in which the flexible display 330 is extended.

Referring to FIGS. 7 and 8, the electronic device 300 may include the first structure 310, the second structure 320, the flexible display 330, a cover 313, a roller 315, and a camera module 305 (e.g., the camera module 105 of FIGS. 1 to 3 or the camera module 205 of FIG. 4).

In an embodiment of the disclosure, the first structure 310 and the second structure 320 may be coupled so as to slide relative to each other. For example, the first structure 310 may be fixed, and the second structure 320 may be located such that at least part thereof is movable relative to the first structure 310 in sliding directions S1 and S2. The roller 315 rotating about a rolling axis R may be coupled to the first structure 310. The second structure 320 may overlap at least a partial area of the first structure 310. For example, the second structure 320 may surround at least a partial area of the first structure 310. The second structure 320 may be coupled to the flexible display 330 so as to move together with the flexible display 330.

In an embodiment of the disclosure, the second structure 320 may include a first part 321 supporting at least part of a first area 331 of the flexible display 330 and a second part 322 supporting at least part of a second area 332 of the flexible display 330. For example, the second part 322 may include a multi joint module 325 coupled to the roller 315. According to an embodiment of the disclosure, the multi joint module 325 may include a form in which bars extending in substantially the same direction as the rolling axis R of the roller 315 are arranged. The multi joint module 325 may be bent at relatively thin portions between the bars. In an embodiment of the disclosure, the multi joint module 325 may be referred to as another term, such as a flexible track or a hinge rail.

In an embodiment of the disclosure, the first part 321 may slide in the sliding directions S1 and S2. In an embodiment of the disclosure, one portion of the second part 322 may rotate together with the roller 315, and another portion of the second part 322 may slide in the sliding directions S1 and S2.

In an embodiment of the disclosure, the flexible display 330 may include the first area 331 and the second area 332 flexibly extending from the first area 331. In an embodiment of the disclosure, the first area 331 may form at least part of the front surface of the electronic device 300 in the first state and may form at least part of the front surface of the electronic device 300 together with at least part of the second area 332 in the second state. In an embodiment of the disclosure, in the first state, the second area 332 may be located inside the electronic device 300, and in the second state, at least part of the second area 332 may form the front surface of the electronic device 300.

For example, as the second structure 320 moves relative to the first structure 310 in the first sliding direction S1, the second area 332 of the flexible display 330 may form a display area together with the first area 331. For example, as the second structure 320 moves relative to the first structure 310 in the second sliding direction S2, the second area 332 of the flexible display 330 may be accommodated in the space between the cover 313 and the first structure 310.

In an embodiment of the disclosure, the cover 313 may form the rear surface of the electronic device 300. A space in which the second structure 320 and the second area 332 of the flexible display 330 are accommodated may be formed between the cover 313 and the first structure 310. In various embodiments of the disclosure, the cover 313 may have a transparent area (not illustrated) through which the second area 332 of the flexible display 330 is visible.

In an embodiment of the disclosure, the roller 315 may rotate about the rolling axis R. The roller 315 may be rotatably coupled to the first structure 310. The roller 315 may be coupled to a portion of the second part 322 of the second structure 320. For example, the roller 315 may move a portion of the second part 322 of the second structure 320. The roller 315 may be brought into contact with another portion of the second structure 320 depending on a change in the state of the electronic device 300.

In an embodiment of the disclosure, the camera module 305 may be located on the second structure 320 or the flexible display 330 so as to move together with the second structure 320 and the flexible display 330. For example, a camera area 306 aligned with a lens of the camera module 305 may be formed in the first area 331 of the flexible display 330. For example, the camera module 305 may be attached to the rear surface of the flexible display 330. In an embodiment of the disclosure, the camera module 305 may be disposed such that to receive external light, the optical axis (e.g., the optical axis L of FIGS. 10 to 12) of the lens passes through at least some layers (e.g., the panel layer 520 of FIG. 10) of the flexible display 330.

In an embodiment of the disclosure, the flexible display 330 may include a display area that is exposed on a surface of the electronic device 300 and on which contents are displayed. For example, the display area may be formed by the first area 331 of the flexible display 330 in the first state and may be formed by the first area 331 and part of the second area 332 of the flexible display 330 in the second state. In an embodiment of the disclosure, at least part of the camera area 306 may be formed in the first area 331.

In an embodiment of the disclosure, the camera module 305 may receive light through the camera area 306 formed in the display area. The camera area 306 may be included in the display area. When the camera area 306 is included in the display area, this may mean that at least part of the camera area 306 overlaps the display area. For example, when the camera module 305 does not operate, the camera area 306 may display contents like the other areas of the display area. For example, when the camera module 305 operates (e.g., a photographing mode), the camera area 306 may not display contents, or may display different contents from the other areas of the display area. For example, when the camera module 305 operates (e.g., a photographing mode), light incident on the camera module 305 may pass through the camera area 306.

In an embodiment of the disclosure, an optical signal input through the camera area 306 may pass through a pixel array (e.g., the panel layer 520 of FIG. 10) of the flexible display 330 and the lens of the camera module 305 and may be received by an image sensor (e.g., the image sensor 426 of FIG. 10) of the camera module 305. For example, the camera module 305 may include an under display camera (UDC).

In an embodiment of the disclosure, the electronic device 300 may include a first edge P1 and a second edge P2 parallel to the rolling axis R. The first edge P1 may be an edge adjacent to the roller 315, and the second edge P2 may be an edge relatively far away from the roller 315 in the first sliding direction S1. For example, the second edge P2 may be formed by the second structure 320. In an embodiment of the disclosure, the camera module 305 may be disposed at a position adjacent to the second edge P2. In various embodiments of the disclosure, the first state may be defined as the state in which the first edge P1 and the second edge P2 are spaced apart from each other by a first distance, and the second state may be defined as the state in which the first edge P1 and the second edge P2 are spaced apart from each other by a second distance greater than the first distance.

In an embodiment of the disclosure, in the first area 331 of the flexible display 330, the camera area 306 may be formed at a position adjacent to the second edge P2 of the electronic device 300. However, the position of the camera area 306 is not limited thereto. In another example, the camera area 306 may be formed in another portion of the first area 331 of the flexible display 330.

Referring to FIG. 9, in an embodiment of the disclosure, the electronic device 300 may further include tension belts 318 and second rollers 317. The tension belts 318 may connect the first part 321 and the second part 322 of the second structure 320. The second rollers 317 may rotate in the opposite direction to that of the roller 315. For example, when the electronic device 300 is changed from the second state to the first state, the tension belts 318 may provide tension to the second part 322 of the second structure 320 such that the second structure 320 and the flexible display 330 are accommodated in the electronic device 300. For example, when the first part 321 of the second structure 320 moves in the second sliding direction S2, the tension belts 318 may provide tension to the second part 322 of the second structure 320 such that the second part 322 of the second structure 320 moves in the first sliding direction S1.

In an embodiment of the disclosure, the camera module 305 may be located on the second structure 320 or the first area 331 of the flexible display 330 so as to move together with the second structure 320 and the first area 331 of the flexible display 330. For example, the camera module 305 may be attached to the rear surface of the flexible display 330. For example, part of the camera module 305 may be inserted into a through-hole 329 formed through the first part 321 of the second structure 320. For example, part of the camera module 305 may be located in a recess or opening 319 formed in the first structure 310. In an embodiment of the disclosure, the recess or opening 319 formed in the first structure 310 may be open in the first sliding direction S1. For example, the camera module 305 may move in the sliding directions S1 and S2 together with the second structure 320 and the first area 331 of the flexible display 330.

In an embodiment of the disclosure, the first area 331 of the flexible display 330 may be disposed on a first surface (e.g., an upper surface in FIG. 9) of the first structure 310, and a printed circuit board 350 may be disposed on a second surface (e.g., a lower surface in FIG. 9) of the first structure 310. In an embodiment of the disclosure, the second structure 320 may surround the first surface of the first structure 310, the second surface of the first structure 310, and the roller 315. In an embodiment of the disclosure, the electronic device 300 may further include the printed circuit board 350 disposed on the second surface of the first structure 310.

Figure 10:
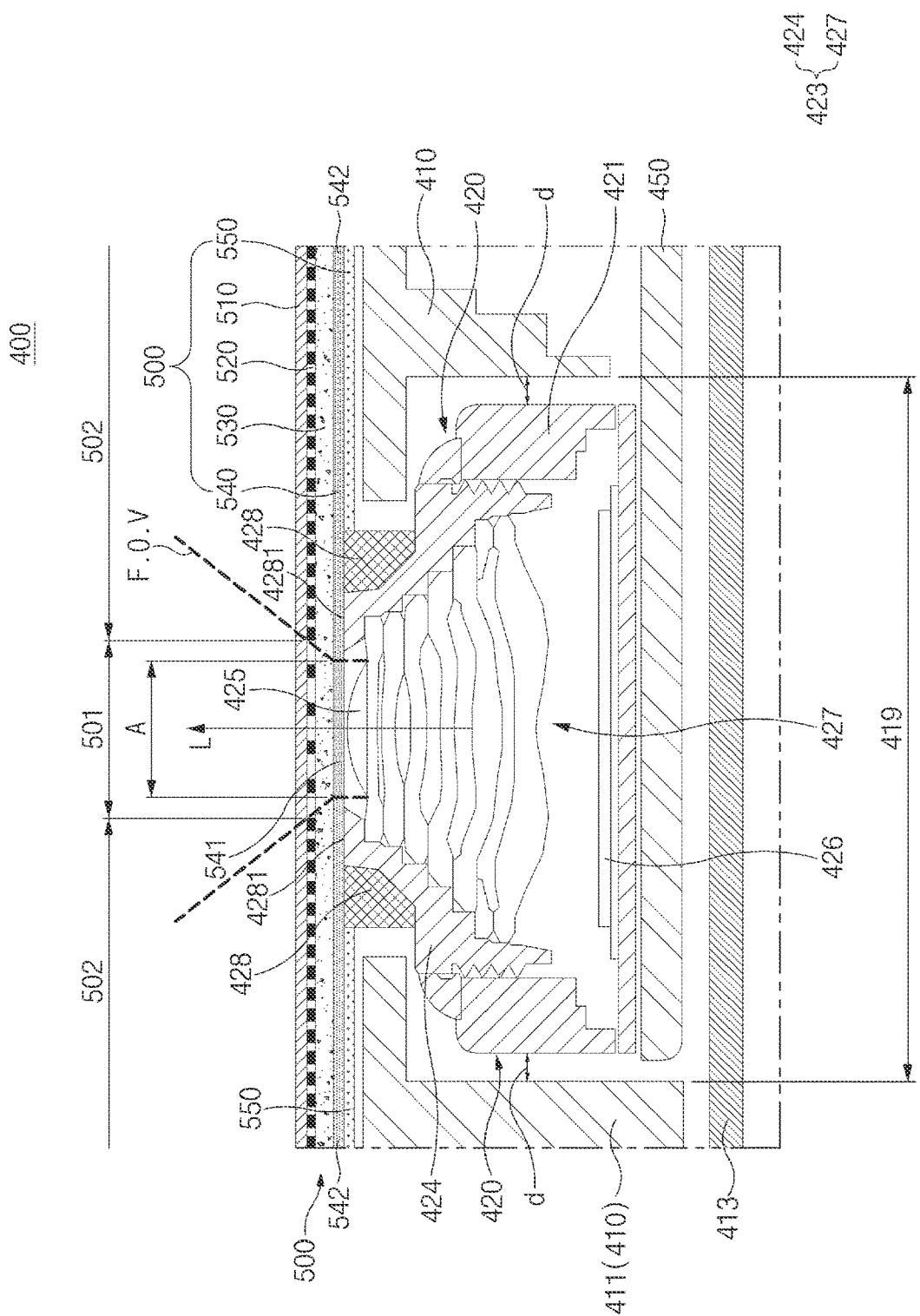
FIG. 10 is a sectional view of a camera area of an electronic device according to an embodiment of the disclosure.

FIG. 10 is a sectional view of a camera area of an electronic device according to an embodiment of the disclosure.

Referring to FIG. 10, it is a sectional view of the camera area 106 of the electronic device 100 illustrated in FIG. 1. For example, FIG. 10 is a sectional view of the camera area 206 of the foldable electronic device 200 illustrated in FIGS. 4 to 6. For example, FIG. 10 is a sectional view of the camera area 306 of the slidable electronic device 300 illustrated in FIGS. 7 to 9.

Referring to FIG. 10, the electronic device 400 may include a housing 410 including a plate structure 411 (e.g., the first support member 140 of FIG. 3, the first structure 241 and the second structure 242 of FIG. 4, or the first structure 310 and the second structure 320 of FIG. 9), a camera module 420 (e.g., the camera module 105 of FIGS. 2 to 2, the camera module 205 of FIGS. 4 to 6, or the camera module 305 of FIGS. 7 to 9), a display 500, and a cover 413.

In an embodiment of the disclosure, the plate structure 411 of the housing 410 may include an opening 419 in which at least part of the camera module 420 is accommodated. The display 500 may be disposed on one side of the plate structure 411 (e.g., an upper side of the drawing), and a printed circuit board 450 may be disposed on an opposite side of the plate structure 411 (e.g., a lower side of the drawing). The sidewall of the opening 419 of the plate structure 411 may be spaced apart from the camera module 420 by a predetermined gap d.

The plate structure 411 illustrated in FIG. 10 may include the first support member 140 illustrated in FIG. 3, the plate structures 241 and 242 illustrated in FIG. 4, and the first structure 310 or the second structure 320 illustrated in FIG. 9. The opening 419 illustrated in FIG. 10 may include the opening 149 illustrated in FIG. 3, the opening 249 illustrated in FIG. 4, and the opening 319 illustrated in FIG. 9.

In an embodiment of the disclosure, the cover 413 may form surfaces of the electronic device 400 together with the display 500. For example, the cover 413 may form the rear surface of the electronic device 400. In some embodiments of the disclosure, the cover 413 may form a housing (e.g., the first housing 110 of FIG. 1) together with a cover layer 510 included in the display 500.

The display 500 illustrated in FIG. 10 may include the display 130 illustrated in FIG. 3, the flexible display 230 illustrated in FIG. 4, and the flexible display 330 illustrated in FIG. 9.

In an embodiment of the disclosure, the display 500 may include a first area 501 having a relatively low pixel density and a second area 502 around the first area 501. In an embodiment of the disclosure, the first area 501 may be formed to include the field of view (FOV) of the camera module 420. The field of view (FOV) of the camera module 420 may vary depending on the angle of view of the camera module 420. For example, when the camera module 420 is a wide camera module, the area of the first area 501 may increase. The camera module 420 may receive light passing through the first area 501 and may generate an image signal. The first area 501 illustrated may include the camera area 106 illustrated in FIGS. 1 and 2, the camera area 206 illustrated in FIGS. 4 and 6, and the camera area 306 illustrated in FIGS. 7 to 9.

In an embodiment of the disclosure, the display 500 may include a plurality of layers. The plurality of layers may include the cover layer 510 forming a surface of the electronic device 400, the panel layer 520 including a pixel array, a base layer 530, a support layer 550, and/or an aperture layer 540. According to an embodiment of the disclosure, at least a part of the plurality of layers of the display 500 may be attached by using an optical clear adhesive member. For example, the optical clear adhesive member may include an optical clear adhesive (OCA), an optical clear resin (OCR), or a super view resin (SVR). In an embodiment of the disclosure, the cover layer 510 may be formed of a transparent material. The cover layer 510 may contain a polyimide (PI) material and/or a glass material (e.g., an ultra thin glass (UTG)). The cover layer 510 may form at least part of the front surface of the electronic device 400. For example, the cover layer 510 may be implemented in the form of a thin film (e.g., a thin film layer) that protects the display 500 from the outside and contributes to flexibility.

According to an embodiment (not illustrated) of the disclosure, the cover layer 510 may include a plurality of layers. For example, the cover layer 510 may have a form in which various coating layers are disposed on a plastic film or thin-film glass. For example, the cover layer 510 may have a form in which at least one protective layer or coating layer containing a polymer material (e.g., polyester (PET), polyimide (PI), or thermoplastic polyurethane (TPU)) is disposed on a plastic film or thin-film glass. In an embodiment of the disclosure, the base layer 530 may contain a transparent polymer material and/or a glass material and may serve to support and protect the panel layer 520. For example, the base layer 530 may be referred to as the protective film, the back film, or the back plate. In an embodiment of the disclosure, the panel layer 520 including the pixel array may be disposed over the base layer 530. For example, wiring connected to the pixel array may be formed in the base layer 530.

In an embodiment of the disclosure, the panel layer 520 may include the pixel array including a plurality of light emitting elements (e.g., organic light emitting diodes). For example, the panel layer 520 may include a pixel array including a plurality of pixels implemented with light emitting elements, such as organic light emitting diodes or micro light emitting diodes (micro LEDs), and an encapsulation layer (not illustrated). For example, the encapsulation layer (e.g., a thin-film encapsulation (TFE) layer) may serve as a protective layer for protecting the pixel array. For example, the encapsulation layer may seal the pixel array to prevent infiltration of foreign matter into the pixel array.

According to an embodiment of the disclosure, the panel layer 520 may be disposed on a thin-film transistor (TFT) film through evaporation of an organic material, and the TFT film may be located between the panel layer 520 and the base layer 530. The TFT film may refer to a structure in which at least one TFT is disposed on a flexible substrate (e.g., a PI film) through a series of processes including deposition, patterning, etching, and the like. The at least one TFT may adjust On/Off of a pixel or the brightness of the pixel by controlling a current for a light emitting element of the pixel array. The at least one TFT may be implemented with, for example, an amorphous silicon (a-Si) TFT, a liquid crystal polymer (LCP) TFT, a low-temperature polycrystalline oxide (LTPO) TFT, or a low-temperature polycrystalline silicon (LTPS) TFT.

In an embodiment of the disclosure, the aperture layer 540 may perform an aperture function for the camera module 420. For example, the aperture layer 540 may include a transparent area 541 formed to be substantially the same as, or larger than, the field of view (FOV) of the camera module 420 and an opaque area 542 around the transparent layer 541. For example, the opaque area 542 may be an area printed (or, dipped) in black. In an embodiment of the disclosure, the opaque area 542 may prevent light reflected or refracted by other layers from being incident on the camera module 420. In an embodiment of the disclosure, the transparent area 541 may be formed to be substantially the same as, or smaller than, the first area 501. For example, when viewed from above the display 500, the transparent area 541 may at least partially overlap the first area 501. For example, the aperture layer 540 may contain a polymer material (e.g., polyester (PET) or polyimide (PI)) or a glass material and may perform an aperture function of the camera module 420 through the opaque area 542.

According to an embodiment of the disclosure, the aperture layer 540 may block light incident from the outside. For example, the aperture layer 540 may include a light blocking layer or an embo layer. For example, the embo layer may be an opaque layer (e.g., a black layer) including an uneven pattern (e.g., an embossing pattern).

In an embodiment of the disclosure, the support layer 550 may include a cushion member, a layer for shielding light, a layer for absorbing or shielding electromagnetic waves, and a layer for diffusing, spreading, or radiating heat. According to an embodiment of the disclosure, the cushion member may alleviate an external impact applied to the display 500. For example, the cushion member may include a sponge layer or a cushion layer.

In an embodiment of the disclosure, the support layer 550 may include a shielding layer for shielding the display 500 and/or a metal layer (e.g., a conductive member) for maintaining a flat surface of the display 500. For example, the metal layer may contain at least one of copper (Cu), aluminum (Al), stainless steel (SUS), or CLAD (e.g., a laminated member in which SUS and Al are alternately arranged).

In various embodiments of the disclosure, the support layer 550 may diffuse, spread, or radiate heat generated from the electronic device 400 or the display 500 (e.g., a display driver IC). For example, the support layer 550 may include a layer containing graphite and/or a conductive adhesive layer.

In various embodiments of the disclosure, the support layer 550 may absorb or shield electromagnetic waves (or, noise) and may alleviate an external impact applied to the electronic device 400 or the display 500. According to an embodiment of the disclosure, the support layer 550 may include a composite sheet or a copper sheet, and the composite sheet may be a sheet obtained by laminating layers or sheets having different properties. For example, the composite sheet may be replaced with a single sheet containing one material (e.g., polyimide or graphite).

According to an embodiment of the disclosure, the aperture layer 540 and/or at least one of the plurality of layers (e.g., the light blocking layer, the cushion member, the composite sheet, and the copper sheet) included in the support layer 550 may be omitted. According to an embodiment of the disclosure, the sequence in which the plurality of layers included in the display 500 are arranged may be variously changed without being limited to the embodiment of FIGS. 10 to 12.

According to an embodiment of the disclosure, at least a part of the plurality of layers included in the display 500 may include an opening formed to correspond to the camera module 420 located inside the electronic device 400. The camera module 420 may at least partially overlap the opening, or at least part of the camera module 420 may be inserted into the space of the opening. In various embodiments of the disclosure, at least two layers may include openings, respectively, and the openings formed in the respective layers may at least partially overlap each other and may have substantially the same size and shape. According to some embodiments of the disclosure, the sizes or shapes of the openings formed in the respective layers may not be the same as each other.

In various embodiments of the disclosure, the support layer 550 may be opaque such that the inside of the electronic device 400 is not exposed on the surface of the electronic device 400.

In an embodiment of the disclosure, the support layer 550 may have an opening formed therein in which at least part of the camera module 420 is accommodated. For example, the opening may be formed through the support layer 550 such that a transparent layer (e.g., the base layer 530) or the transparent area 541 of the aperture layer 540 is at least partially exposed.

In various embodiments of the disclosure, at least some layers may be formed such that at least a partial area is flexible. For example, in the foldable electronic device 200 and the slidable electronic device 300, at least partial areas of the displays 230 and 330 may be deformed to be flat or curved. In various embodiments of the disclosure, the display 500 may further include an additional layer disposed between the cover layer 510 and the panel layer 520. In various embodiments of the disclosure, the additional layer may include at least one of a polarizing plate or a touch electrode layer including a touch electrode.

According to an embodiment of the disclosure, the polarizing plate may improve outdoor visibility of a screen and may selectively transmit light that is generated from a light source of the panel layer 520 and that oscillates in a predetermined direction. The polarizing plate may include, for example, a polarizing layer or a polarizer, or a phase retardation layer or a phase retarder.

According to an embodiment of the disclosure, the touch electrode layer may be implemented with a transparent conductive layer (or, film) based on a conductive material, such as indium tin oxide (ITO), or may include a conductive pattern, such as a metal mesh (e.g., an aluminum metal mesh). For example, in response to bending of the display 500, the metal mesh may have durability greater than that of the transparent conductive layer implemented with ITO.

According to an embodiment of the disclosure, the display 500 may further include a pressure sensor for measuring the intensity (pressure) of a touch. The camera module 420 illustrated in FIG. 10 may include the camera module 105 illustrated in FIG. 3, the camera module 205 illustrated in FIG. 4, the camera module 305 illustrated in FIG. 9, and the camera module 1280 of FIG. 15.

Figure 15:
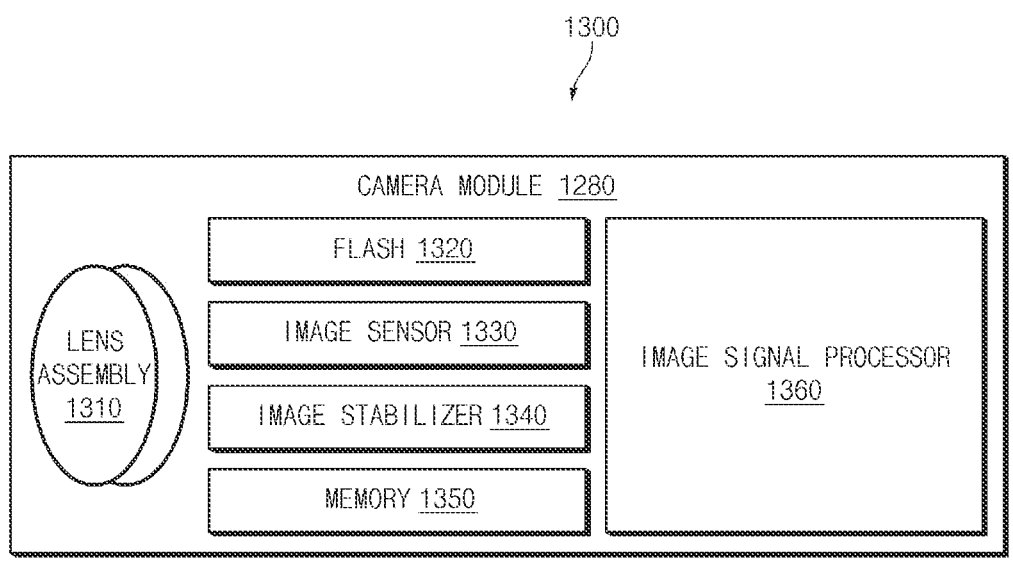
FIG. 15 is a block diagram illustrating a camera module according to an embodiment of the disclosure.

In an embodiment of the disclosure, the camera module 420 may include a camera housing 421, a lens assembly 423 (e.g., a lens assembly 1310 of FIG. 15), and the image sensor 426 (e.g., an image sensor 1330 of FIG. 15). The camera housing 421 may surround a plurality of lenses 427 together with a lens barrel 424. The image sensor 426 may be disposed in the camera housing 421. The image sensor 426 may covert an optical signal passing through the lenses 427 into an electrical signal.

In an embodiment of the disclosure, the lens assembly 423 may include the plurality of lenses 427 and the lens barrel 424. The plurality of lenses 427 may include a first lens 425 closest to the display 500 when viewed in the direction of the optical axis L. The lens barrel 424 may further protrude toward the display 500 beyond the camera housing 421.

In various embodiments of the disclosure, the lens barrel 424 may include an adhesive area 4281 (e.g., an upper surface of the lens barrel 424 in the drawing) that faces the rear surface of the display 500 and that is attached to the rear surface of the display 500. The adhesive area 4281 may be formed around an opening area (e.g., the field of view diameter A of the camera module 420) through which the lenses 427 of the camera module 420 are exposed. For example, the adhesive area 428 may be attached to the rear surface of the panel layer 520 or the aperture layer 540 of the display 500.

In various embodiments of the disclosure, the lens barrel 424 and/or the camera housing 421 may be attached to the display 500 through an adhesive member 428. For example, the adhesive member 428 may surround the lateral portion of the lens barrel 424 and may be attached to the rear surface of the display 500. Accordingly, the bonding area between the camera module 420 and the display 500 may be increased, and thus the camera module 420 and the display 500 may be more firmly coupled with each other. For example, the adhesive member 428 and the display 500 may be attached to each other by an optical clear adhesive (OCA).

According to various embodiments of the disclosure, the camera module 420 may be attached to the aperture layer 540 such that the optical axis L of the lenses 427 is aligned with the transparent area 541 of the aperture layer 540. The aperture layer 540 having the camera module 420 attached thereto may be attached to another layer of the display 500. For example, the aperture layer 540 may be laminated on the rear surface of the panel layer 520. The plate structure 411 of the housing 410 may have the opening 419 formed therein in which part of the camera module 420 is located.

In an embodiment of the disclosure, the camera module 420 may further include a connecting member (not illustrated) that extends to the printed circuit board 450 of the electronic device 400. For example, the printed circuit board 450 may be disposed on a second surface of the housing 410 (e.g., a lower surface in the drawing). The connecting member may transmit an image-related electrical signal generated from the image sensor 426 to the printed circuit board 450 (e.g., a processor 1220 of FIG. 14 or an image signal processor 1360 of FIG. 15) of the electronic device 400.

In an embodiment of the disclosure, the camera module 420 may be coupled to at least one of the plurality of layers of the display 500. For example, the camera module 420 may be attached to at least one of the plurality of layers of the display 500 through a transparent adhesive layer (not illustrated). For example, the transparent adhesive layer may be attached to an area not overlapping the field of view (FOV) of the camera module 420. For example, the transparent adhesive layer may attach a partial area of the lens barrel 424 of the camera module 420 and the opaque area 542 of the aperture layer 540.

In an embodiment of the disclosure, the field of view diameter A of the camera module 420 may be formed in a size smaller than, or corresponding to, the first area 501. In an embodiment of the disclosure, the field of view diameter A of the camera module 420 may be formed in a size smaller than, or corresponding to, the transparent area 541 of the aperture layer 540.

In an embodiment of the disclosure, the camera module 420 may be coupled to the rear surface of the display 500 such that the lenses 427 receive light passing through the pixel array. For example, the optical axis L of the lenses 427 may pass through the first area 501 of the display 500 that has a relatively low pixel density.

In an embodiment of the disclosure, at least part of the camera module 420 may be accommodated in the opening 429 formed in the housing 410. The camera module 420 may be disposed such that the camera housing 421 and/or the lens barrel 424 is spaced apart from the sidewall of the opening 419 by the predetermined gap d.

The electronic device 400 according to the embodiment of the disclosure is not limited to the structure illustrated in the drawing and may not include some components (e.g., the aperture layer 540 and the adhesive layer 428) among the illustrated components, or may further include additional component(s).

In an embodiment of the disclosure, the first lens 425 of the camera module 420 may make contact with the transparent area 541 of the aperture layer 540. For example, when the first lens 425 is a spherical lens, the first lens 425 may substantially make point contact with the transparent area 541 of the aperture layer 540. For example, the transparent area 541 of the aperture layer 540 may extend in the direction of a tangential surface of the first lens 425. For example, the gap between the first lens 425 and the display 500 may be minimized, and the area of the first area 501 may be decreased.

Furthermore, the camera module 420 may be attached to the flexible display 230 or 330 included in the foldable electronic device 200 or the slidable electronic device 300, and the alignment of the first area 501 and the camera module 420 may be maintained despite a change in the state of the electronic device.

The relative positions of the camera area 206 and the camera module 205 in a flat state (e.g., the flat state of FIG. 5) may vary depending on deformation of the flexible display 230 in a folded state (e.g., the folded state of FIG. 6). For example, the relative positions of the camera area 306 and the camera module 305 in a first state (e.g., the first state of FIG. 7) may vary depending on deformation of the flexible display 330 in a second state (e.g., the second state of FIG. 8). For example, the alignment of the camera module 305 and the camera area 306 may vary depending on a change in the state of the electronic device. This may cause deterioration in the performance of the camera module 205 or 305. Furthermore, when the camera area 206 or 306 is increased based on alignment depending on a change in the state of the electronic device, the quality (e.g., resolution) of the display area may be deteriorated.

According to the embodiments of the disclosure, at least part of the camera module 420 may be coupled to the display 500 such that the camera module 420 (e.g., the camera module 205 or 305) and the display 500 integrally behave. Accordingly, the relative positions of the first area 501 (e.g., the camera area 206 or 306) and the camera module 420 may be fixed. Therefore, it is not necessary to increase the size of the first area 501, and the first area 501 (e.g., the camera area) having a relatively decreased area may be provided. For example, when the camera module 420 is not attached to the flexible display 500, a tolerance related to deformation of the flexible display 500 may not be included. Accordingly, when the camera module 420 is attached to the flexible display 500, the size of the first area 501 may be reduced by the tolerance. For example, because the area of the first area 501 is decreased, the ratio of the area occupied by the field of view diameter A of the camera module 420 to the area of the first area 501 of the display 500 may be increased. In other words, the remaining areas of the first area 501 other than the area occupied by the field of view diameter A may be reduced. Because light is not incident on the remaining areas, the remaining areas may be areas not related to the performance of the camera module 420.

In the electronic device 200 or 300, a camera module (e.g., the camera module 420) may be disposed in a plate structure (e.g., the plate structure 411) of a housing (e.g., the housing 410). For example, the plate structure of the housing may have a seating portion formed therein in which the camera module is disposed, and the camera module disposed in the seating portion may be aligned with a camera area (e.g., the first area 501) of a display (e.g., the display 500). According to the comparative example, structures (e.g., the plate structure, the camera module, and the display) of the electronic device may have predetermined tolerances for alignment of the camera module with the camera area of the display. For example, the plate structure of the housing may include a tolerance related to the position of the seating portion, the display may include a tolerance related to the camera area, and the camera module may include a tolerance related to the size of the camera module and the position of a lens. Furthermore, according to the comparative example, the electronic device may further include an assembly tolerance for assembly of the plate structure, the camera module, and the display. In addition, according to the comparative example, the foldable electronic device and/or the slidable electronic device may further include a tolerance considering deformation of the flexible display.

According to an embodiment of the disclosure, the camera module 420 may be disposed on the rear surface of the display 500, and therefore structures of the electronic device may include relatively small tolerances, or may be assembled without tolerance. For example, even when the camera module 420 is disposed on the display 500 so that a tolerance does not exist or is decreased, the alignment of the first area 501 (e.g., the camera area) and the camera module 420 may be ensured. For example, the plate structure 411 of the housing 410 may not include a tolerance related to a seating portion in which the camera module 420 is disposed, or may include a tolerance smaller than that in the comparative example. The display 500 and the camera module 420 may not include a tolerance related to the alignment of the first area 501 (e.g., the camera area) and the lenses 427, or may include a tolerance smaller than that in the comparative example.

According to the comparative example, a predetermined air gap may be formed between the camera module (e.g., the camera module 420) and the rear surface of the display (e.g., the display 500). As the air gap is increased, the distance between the camera module and the surface of the display may be increased, and the required area of the camera area (e.g., the first area 501) may be increased. For example, the air gap according to the comparative example may be about 0.3 mm.

According to an embodiment of the disclosure, the camera module 420 may be attached to the rear surface of the display 500, and therefore the air gap may be decreased. That is, the distance between the surface of the display 500 and the camera module 420 may be decreased. For example, the air gap may range from about 0.01 mm to about 0.03 mm Due to the decreased air gap and the decreased distance, the area of the first area 501 (e.g., the camera area) formed on the surface of the display 500 may be decreased.

Figure 11:
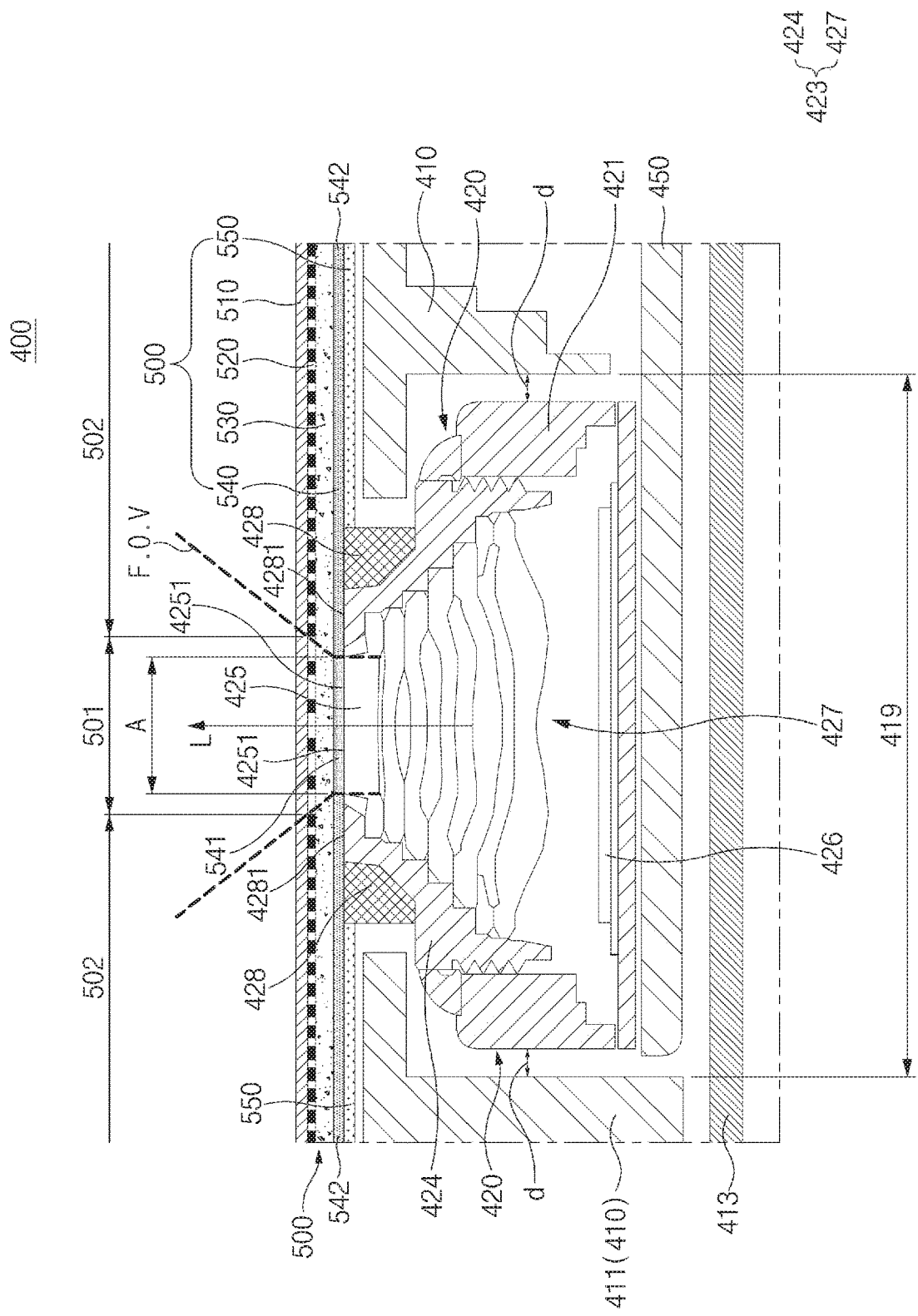
FIG. 11 is a sectional view of a camera area of an electronic device according to an embodiment of the disclosure.
Figure 12:
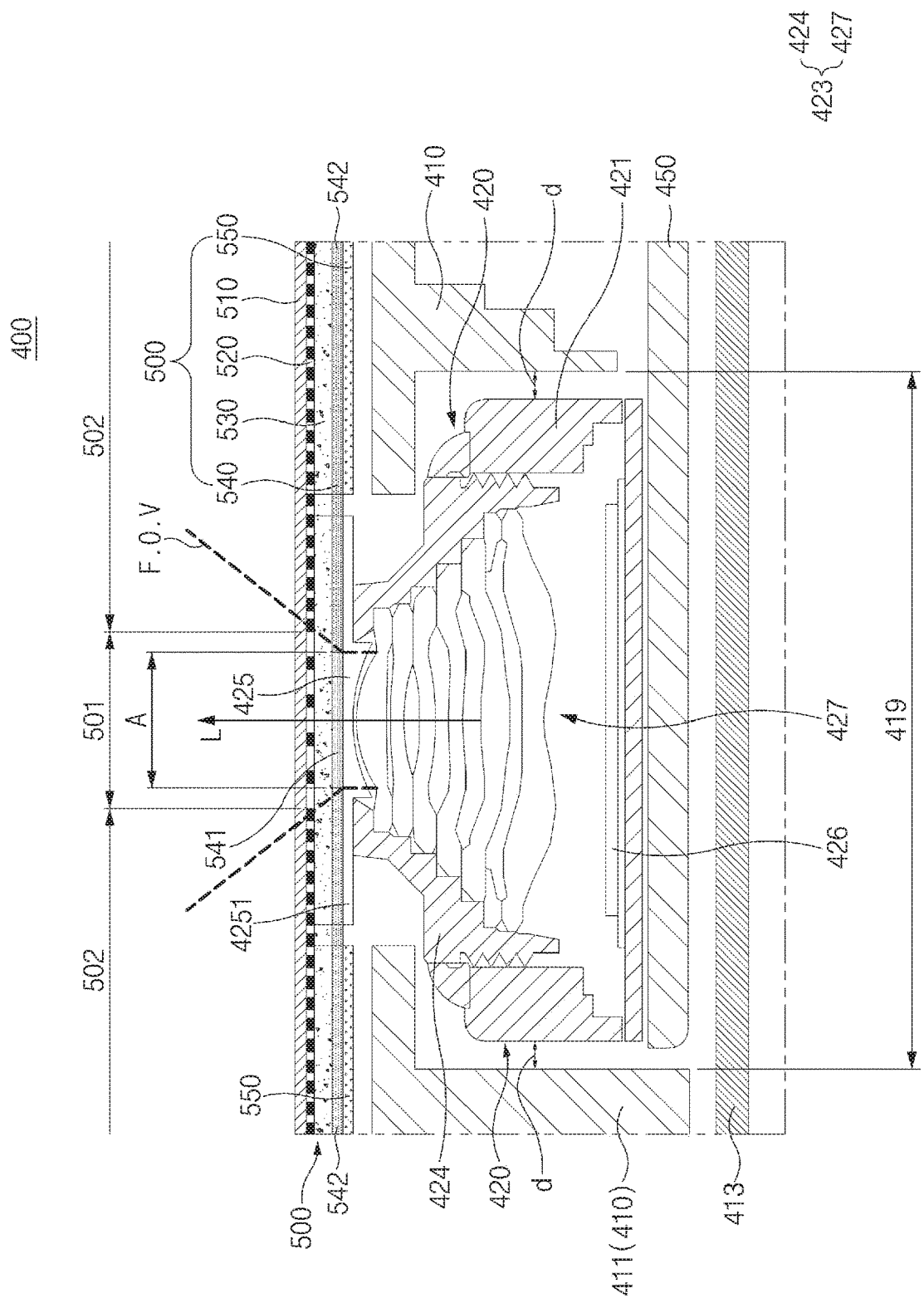
FIG. 12 is a sectional view of a camera area of an electronic device according to an embodiment of the disclosure.

FIG. 11 is a sectional view of a camera area of an electronic device according to an embodiment of the disclosure. FIG. 12 is a sectional view of a camera area of an electronic device according to an embodiment of the disclosure. In describing FIGS. 11 and 12, contents identical to ones given with reference to FIG. 10 will be omitted.

Referring to FIG. 11, a camera module 420 may include a first lens 425, at least part of which is flat. The first lens 425 may be defined as a lens closest to a display 500 when viewed in the direction of an optical axis L, among a plurality of lenses 427 included in a lens assembly 423.

In an embodiment of the disclosure, the first lens 425 may be surrounded by a lens barrel 424. For example, an upper surface of the lens barrel 424 and a flat area 4251 of the first lens 425 may form substantially the same plane. The flat area 4251 of the first lens 425 may make surface-to-surface contact with a transparent area 541 of an aperture layer 540. The upper surface of the lens barrel 424 may be attached to an opaque area 542 of the aperture layer 540 by a transparent adhesive layer.

In various embodiments of the disclosure, the aperture layer 540 may include an embossing pattern. For example, the embossing pattern may be formed on the opaque area 542 of the aperture layer 540. The embossing pattern may be attached to a rear surface of a panel layer 520.

In various embodiments of the disclosure, the display 500 is not limited to necessarily including the aperture layer 540. For example, when the aperture layer 540 is omitted, the flat area 4251 of the first lens 425 may be attached to the rear surface of the panel layer 520.

In various embodiments of the disclosure, the transparent area 541 of the aperture layer 540 may have a size smaller than or equal to that of the flat area 4251.

In various embodiments of the disclosure, a transparent adhesive layer (not illustrated) may be disposed between the flat area 4251 of the first lens 425 and the transparent area 541 of the aperture layer 540. At this time, an adhesive material contained in the transparent adhesive layer may be determined based on the path of light incident on the camera module 420.

Referring to FIG. 12, a camera module 420 may include a first lens 425, at least part of which is flat. The first lens 425 may be defined as a lens closest to a display 500 when viewed in the direction of an optical axis L, among a plurality of lenses 427 included in a lens assembly 423.

In an embodiment of the disclosure, the first lens 425 may be formed such that one part is accommodated in a lens barrel 424 and another part is located outside the lens barrel 424. The part located outside the lens barrel 424 may include a flat area 4251. The flat area 4251 may make contact with a transparent area 541 of an aperture layer 540. In various embodiments of the disclosure, the flat area 4251 of the first lens 425 may be attached to an embossing pattern of the aperture layer 540. In an embodiment of the disclosure, the flat area 4251 may be attached to a transparent layer located under a panel layer 520 among a plurality of layers. For example, the flat area 4251 may be attached to the aperture layer 540 or a base layer 530 by a transparent adhesive layer.

In various embodiments of the disclosure, the transparent area 541 of the aperture layer 540 may have a size smaller than or equal to that of the flat area 4251.

In various embodiments of the disclosure, the transparent adhesive layer (not illustrated) may be formed on the entire flat area 4251 of the first lens 425, or may be formed on a peripheral area not included in the field of view (FOV) of the camera module 420.

In an embodiment of the disclosure, the first lens 425 may include the flat area 4251, and therefore the camera module 420 may be stably coupled to the display 500. In an embodiment of the disclosure, the flat area 4251 of the first lens 425 may further extend through the space between the lens barrel 424 and the display 500. For example, the bonding area between the flat area 4251 and the display 500 may be greater than the bonding area between the flat area 4251 and the lens barrel 424. For example, when the transparent adhesive layer is disposed on the flat area 4251, the display 500 and the camera module 420 may be more firmly coupled by the increased bonding area between the display 500 and the camera module 420. In another example, the flat area 4251 may be located in an opening formed in a support layer 550, and therefore an impact applied to the display 500 may be decreased. For example, when an external impact is applied, damage to the display 500 or the camera module 420 may be decreased. Furthermore, the gap between the first lens 425 and the display 500 may be minimized, and therefore the required area of the first area 501 may be decreased. Accordingly, the quality of the display 500 may be improved.

Figure 13:
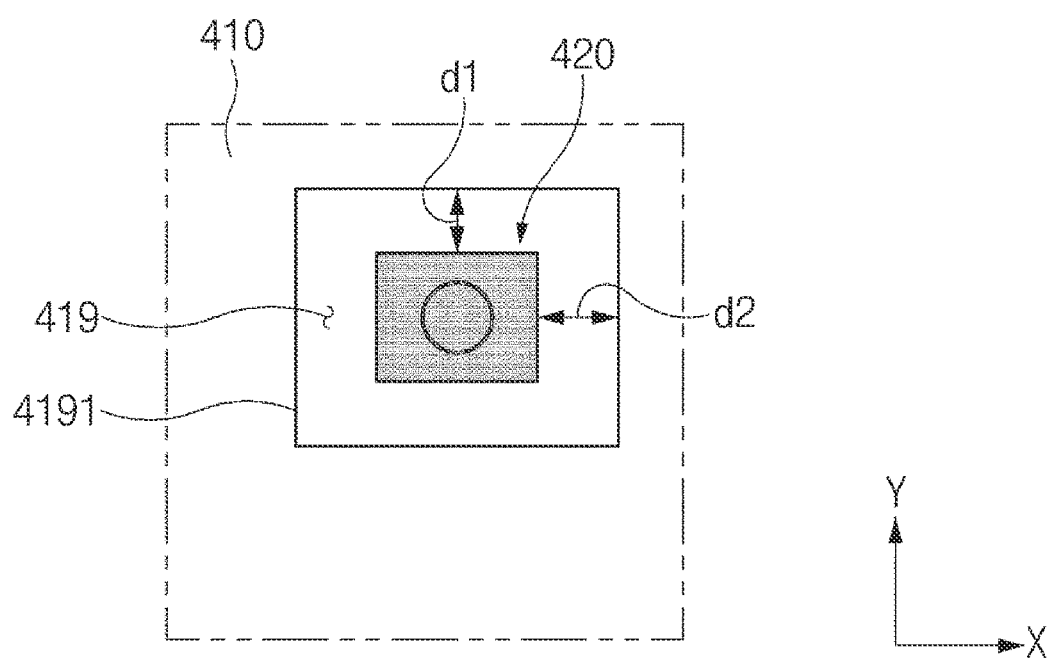
FIG. 13 is a plan view illustrating a housing and a camera module of an electronic device according to an embodiment of the disclosure.

FIG. 13 is a plan view illustrating a housing and a camera module of an electronic device according to an embodiment of the disclosure. FIG. 13 is a view in which a display is omitted.

Referring to FIG. 13, the housing 410 may refer to a structure of the electronic device 400 having an opening 419 formed therein in which at least part of the camera module 420 is accommodated. For example, the housing 410 may include the plate structures 241 and 242 illustrated in FIG. 4 and the first structure 310 illustrated in FIG. 9. The opening 419 illustrated in FIG. 13 may include the opening 249 illustrated in FIG. 4 and the opening 319 illustrated in FIG. 9.

In an embodiment of the disclosure, at least part of the camera module 420 may be located in the opening 419. The camera module 420 may be spaced apart from sidewalls 4191 of the opening 419 by predetermined gaps (e.g., a first gap d1 and a second gap d2). For example, the camera module 420 and the sidewalls 4191 of the opening 419 may be spaced apart from each other by the first gap d1 in the Y-axis direction and by the second gap d2 in the X-axis direction. For example, the second gap d2 may be greater than the first gap d1. In an embodiment of the disclosure, the Y-axis direction may be the direction substantially parallel to the folding axis F in the foldable electronic device 200 and may be the direction substantially parallel to the rolling axis R in the slidable electronic device 300.

In various embodiments of the disclosure, the second gap d2 may be smaller than or equal to the first gap d1.

Referring to FIGS. 4, 5, and 6 together, in the flat state (e.g., FIG. 5), tension may act on the flexible display 230 in the direction perpendicular to the folding axis F to allow the flexible display 230 to remain substantially flat. In the folded state (e.g., FIG. 6), relatively decreased tension may act on the flexible display 230. The tension may be generated by the attachment of the first flat area 231 of the flexible display 230 to the first plate structure 241 and the attachment of the second flat area 232 to the second plate structure 242.

The flexible display 230 of the foldable electronic device 200 may be flexibly formed to expand in the direction perpendicular to the folding axis F in the flat state (e.g., FIG. 5) and contract in the direction perpendicular to the folding axis F in the folded state (e.g., FIG. 6). For example, the camera module 205 attached to the flexible display 230 may move in the direction perpendicular to the folding axis F depending on deformation of the flexible display 230. According to an embodiment of the disclosure, the flexible display 230 may not be substantially deformed in the direction of the folding axis F because tension does not substantially act on the flexible display 230 in the direction of the folding axis F.

The foldable electronic device 200 according to the embodiments of the disclosure may include the housing 410 having the opening 419 in which at least part of the camera module 420 is accommodated, and the sidewalls 4191 of the opening 419 and the camera module 420 may be spaced apart from each other by the first gap d1 in the direction substantially parallel to the folding axis F and by the second gap d2 greater than the first gap d1 in the direction perpendicular to the folding axis F.

The flexible display 330 of the slidable electronic device 300 may be configured such that in the first state (e.g., FIG. 7), the first area 331 forms the front surface of the electronic device 300 and in the second state (e.g., FIG. 8), part of the second area 332 forms the front surface of the electronic device 300 together with the first area 331. For example, the first area 331 may move in the sliding directions S (e.g., the directions perpendicular to the rolling axis R). The camera module 305 may move in the sliding directions S together with the first area 331.

The slidable electronic device 300 according to the embodiments of the disclosure may include the housing 410 having the opening 419 in which at least part of the camera module 420 is accommodated, and the sidewalls 4191 of the opening 419 and the camera module 420 may be spaced apart from each other by the first gap d1 in the direction (e.g., the Y-axis direction) substantially perpendicular to the sliding directions S and by the second gap d2 greater than the first gap d1 in the direction (e.g., the X-axis direction) substantially parallel to the sliding directions S.

In an embodiment of the disclosure, the sidewalls 4191 of the opening 419 and the camera module 420 may be spaced apart from each other by the first gap d in the direction (e.g., the Y-axis direction) substantially parallel to the rolling axis R and by the second gap d2 greater than the first gap d1 in the direction substantially perpendicular to the rolling axis R.

According to an embodiment of the disclosure, the camera module 420 may be implemented with a fixed focus camera and may be disposed on the rear surface of the display (e.g., the display 500 of FIGS. 10 to 12) to form a minimal camera area (e.g., the first area 501 of FIGS. 10 to 12). According to another embodiment of the disclosure, the camera module 420 may perform a specified function (e.g., an auto focus function and/or an optical image stabilization (OIS) function).

An electronic device 400 according to embodiments of the disclosure may include a housing 410 including a plate structure 411, a display 500 that is disposed on the plate structure 411 and that includes a plurality of layers including a cover layer 510 that forms part of a surface of the housing 410 and a panel layer 520 including a light emitting element, and a camera module 420 including a lens assembly 423 including a plurality of lenses 427, at least part of the camera module 420 being located in a space formed in the plate structure 411, and the camera module 420 being coupled to the display 500 such that an extension line of an optical axis L passes through the panel layer 520 and the cover layer 510. The panel layer 520 may include a first area 501 including a field of view (FOV) of the camera module 420 and a second area 502 around the first area 501, and the number of light emitting elements per unit area of the first area 501 may be smaller than the number of light emitting elements per unit area of the second area 502.

In various embodiments of the disclosure, the plurality of layers may include a support layer 550 stacked on a rear surface of the panel layer 520 and an opening formed through at least part of the support layer 550, and at least part of the camera module 420 may be located in the opening.

In various embodiments of the disclosure, the opening may be formed through the support layer 550 such that the rear surface of the panel layer 520 is exposed, and the camera module 420 may be attached to the rear surface of the panel layer 520.

In various embodiments of the disclosure, the lens assembly 423 may further include a lens barrel 424 that surrounds at least a part of the plurality of lenses, and the lens barrel 424 may include an adhesive area 4281 attached to a rear surface of the panel layer 520.

In various embodiments of the disclosure, the adhesive area 4281 may surround an opening area A through which the lenses 427 are exposed, and the adhesive area 4281 may be substantially flat.

In various embodiments of the disclosure, the electronic device may further include an aperture layer 540 disposed between the camera module 420 and the panel layer 520. The aperture layer 540 may include a transparent area 541 aligned with the optical axis L of the lenses 427 and including the field of view of the camera module 420 and an opaque area 542 around the transparent area 541, and the transparent area 541 may function as an aperture of the camera module 420.

In various embodiments of the disclosure, the transparent area 541 may have a smaller area than the first area 501.

In various embodiments of the disclosure, the plurality of lenses 427 may include a first lens 425 closest to the display, the first lens 425 may include a flat area 4251 formed to be substantially flat, and the camera module 420 may be coupled to the display 500 such that the flat area 4251 of the first lens 425 is attached to a rear surface of the panel layer 520.

In various embodiments of the disclosure, the flat area 4251 of the first lens 425, when viewed from above the panel layer 520, may have an area greater than or equal to that of the first area 501.

In various embodiments of the disclosure, the electronic device may further include a printed circuit board 150 or 250 electrically connected with the camera module 420 and disposed in the housing 410. The display 500 may be disposed on one side of the plate structure 411, and the printed circuit board 150 or 250 may be disposed on an opposite side of the plate structure 411. The space may be an opening 419 formed through the plate structure 411.

An electronic device 200 according to embodiments of the disclosure may include a first housing 211 including a first plate structure 241, a second housing 212 including a second plate structure 242, a hinge structure 290 that rotates the first housing 211 and the second housing 212 about a folding axis F such that the first plate structure 241 and the second plate structure 242 face the same direction or form a predetermined angle therebetween, a display 230 including a first flat area 231 disposed on at least part of the first plate structure 241, a second flat area 232 disposed on at least part of the second plate structure 242, and a folding area 233 formed between the first flat area 231 and the second flat area 232 and deformable to be flat or curved, and a camera module 205 or 420 coupled to the display 230 such that an optical axis L of a lens 427 passes through a pixel array 520 included in the display 230. The first plate structure 241 and/or the second plate structure 242 may have an opening 249 formed therein in which at least part of the camera module is accommodated.

In various embodiments of the disclosure, the opening 419 may be formed such that a sidewall is spaced apart from the camera module 420 by a first gap d1 in a direction of the folding axis F and by a second gap d2 in a direction perpendicular to the folding axis F, and the second gap d2 may be greater than the first gap d1.

In various embodiments of the disclosure, the pixel array 520 may include a first area 501 through which the optical axis L of the lens 427 passes and that includes a field of view (FOV) of the camera module 420 and a second area 502 around the first area 501, and the number of light emitting elements per unit area of the first area 501 may be smaller than the number of light emitting elements per unit area of the second area 502.

In various embodiments of the disclosure, the display 230 may further include an aperture layer 540 disposed between the pixel array 520 and the camera module, and the aperture layer 540 may include a transparent area 541 through which the optical axis L of the lens 427 passes and that includes a field of view of the camera module 420 and an opaque area 542 around the transparent area 541.

In various embodiments of the disclosure, a camera area 206 through which the optical axis L of the lens of the camera module 205 or 420 passes may be defined in the first flat area 231 and/or the second flat area 232, and when the camera module 205 or 420 operates, the camera area 206 may display contents different from contents that an area around the camera area 206 displays.

An electronic device 300 according to embodiments of the disclosure may include a first structure 310, a second structure 320 slidably coupled to the first structure 310, in which at least part of the second structure 320 surrounds the first structure 310, a cover 510 that is coupled to the first structure 310 and that forms at least part of a rear surface of the electronic device 300, a display 330 that is disposed on the second structure 320 to move together with the second structure 320 and that includes a first area 331 that forms a front surface of the electronic device 300 and a second area 332 flexibly extending from the first area 331, at least part of the second area 332 being accommodated in a space between the first structure 310 and the cover 510, and a camera module 420 coupled to the second structure 320 or the display 330 to move together with the second structure 320 and the display 330, in which an optical axis L of a lens 427 of the camera module 420 passes through a pixel array 520 of the display 330. The electronic device 300 may include a first state (e.g., FIG. 7) in which the second area 332 is accommodated between the cover 510 and the first structure 310 and a second state (e.g., FIG. 8) in which at least part of the second area 332 forms the front surface together with the first area 331.

In various embodiments of the disclosure, the electronic device 300 may include a first edge P1 and a second edge P2 spaced apart from the first edge P1 in a sliding direction S and substantially parallel to the first edge P1, and the camera module 305 or 420 may be coupled to the display 330 or the second structure 320 so as to be adjacent to the second edge P2.

In various embodiments of the disclosure, the electronic device may further include a roller 315 that rotates part of the second structure 320. The roller 315 may include a rolling axis R substantially perpendicular to a sliding direction S, and the second structure 320 may include a first part 321 that slides to one side along the sliding direction S, a second part 322 that slides to an opposite side along the sliding direction, and a third part formed between the first part 321 and the second part 322 and coupled to the roller 315 to rotate along part of a surface of the roller 315.

In various embodiments of the disclosure, the first structure 310 may have a recess or an opening 419 formed therein in which at least part of the camera module 305 or 420 is located, and the recess or the opening 419 may have a shape open in the sliding direction.

In various embodiments of the disclosure, the pixel array 520 may include a first area 501 including a field of view (FOV) of the camera module 305 or 420 and a second area 502 around the first area 501, and the number of pixels per unit area of the first area 501 may be smaller than the number of pixels per unit area of the second area 502.

FIG. 14 is a block diagram illustrating an electronic device in a network environment according to an embodiment of the disclosure.

Referring to FIG. 14, an electronic device 1201 in a network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment of the disclosure, the electronic device 1201 may communicate with the electronic device 1204 via the server 1208. According to an embodiment of the disclosure, the electronic device 1201 may include a processor 1220, a memory 1230, an input module 1250, a sound output module 1255, a display module 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments of the disclosure, at least one (e.g., the display module 1260 or the camera module 1280) of the components may be omitted from the electronic device 1201, or one or more other components may be added in the electronic device 1201. In some embodiments of the disclosure, some of the components may be implemented as single integrated circuitry. For example, the sensor module 1276 (e.g., a fingerprint sensor, an iris sensor, or an illuminance sensor) may be implemented as embedded in the display module 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment of the disclosure, as at least part of the data processing or computation, the processor 1220 may load a command or data received from another component (e.g., the sensor module 1276 or the communication module 1290) in a volatile memory 1232, process the command or the data stored in the volatile memory 1232, and store resulting data in a non-volatile memory 1234. According to an embodiment of the disclosure, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment of the disclosure, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by other component (e.g., the processor 1220) of the electronic device 1201, from the outside (e.g., a user) of the electronic device 1201. The input module 1250 may include, for example, a microphone, a mouse, a keyboard, or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment of the disclosure, the display module 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment of the disclosure, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment of the disclosure, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment of the disclosure, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment of the disclosure, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1279 may include, for example, a motor, a piezoelectric element, or an electric stimulator.

The camera module 1280 may capture a still image or moving images. According to an embodiment of the disclosure, the camera module 1280 may include one or more lenses, image sensors, image signal processors, or flashes.

The power management module 1288 may manage power supplied to the electronic device 1201. According to one embodiment of the disclosure, the power management module 1288 may be implemented as at least part of, for example, a power management integrated circuit (PMIC).

The battery 1289 may supply power to at least one component of the electronic device 1201. According to an embodiment of the disclosure, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment of the disclosure, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment of the disclosure, the antenna module 1297 may include an antenna including a radiating element including a conductive material or a conductive pattern formed in or on a substrate (e.g., a PCB). According to an embodiment of the disclosure, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment of the disclosure, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment of the disclosure, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

FIG. 15 is a block diagram illustrating a camera module according to an embodiment of the disclosure.

Referring to FIG. 15, a camera module may include a lens assembly 1310, a flash 1320, an image sensor 1330, an image stabilizer 1340, memory 1350 (e.g., buffer memory), or an image signal processor 1360. The lens assembly 1310 may collect light emitted or reflected from an object whose image is to be taken. The lens assembly 1310 may include one or more lenses. According to an embodiment of the disclosure, the camera module 1280 may include a plurality of lens assemblies 1310. In such a case, the camera module 1280 may form, for example, a dual camera, a 360-degree camera, or a spherical camera. Some of the plurality of lens assemblies 1310 may have the same lens attribute (e.g., view angle, focal length, auto-focusing, f number, or optical zoom), or at least one lens assembly may have one or more lens attributes different from those of another lens assembly. The lens assembly 1310 may include, for example, a wide-angle lens or a telephoto lens.

The flash 1320 may emit light that is used to reinforce light reflected from an object. According to an embodiment of the disclosure, the flash 1320 may include one or more light emitting diodes (LEDs) (e.g., a red-green-blue (RGB) LED, a white LED, an infrared (IR) LED, or an ultraviolet (UV) LED) or a xenon lamp. The image sensor 1330 may obtain an image corresponding to an object by converting light emitted or reflected from the object and transmitted via the lens assembly 1310 into an electrical signal. According to an embodiment of the disclosure, the image sensor 1330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1330 may be implemented using, for example, a charged coupled device (CCD) sensor or a complementary metal oxide semiconductor (CMOS) sensor.

The image stabilizer 1340 may move the image sensor 1330 or at least one lens included in the lens assembly 1310 in a particular direction, or control an operational attribute (e.g., adjust the read-out timing) of the image sensor 1330 in response to the movement of the camera module 1280 or the electronic device 1201 including the camera module 1280. This allows compensating for at least part of a negative effect (e.g., image blurring) by the movement on an image being captured. According to an embodiment of the disclosure, the image stabilizer 1340 may detect such a movement by the camera module 1280 or the electronic device 1201 using a gyro sensor (not shown) or an acceleration sensor (not shown) disposed inside or outside the camera module 1280. According to an embodiment of the disclosure, the image stabilizer 1340 may be implemented, for example, as an optical image stabilizer.

The memory 1350 may store, at least temporarily, at least part of an image obtained via the image sensor 1330 for a subsequent image processing task. For example, if image capturing is delayed due to shutter lag or multiple images are quickly captured, a raw image obtained (e.g., a Bayer-patterned image, a high-resolution image) may be stored in the memory 1350, and its corresponding copy image (e.g., a low-resolution image) may be previewed via the display module 1260. Thereafter, if a specified condition is met (e.g., by a user's input or system command), at least part of the raw image stored in the memory 1350 may be obtained and processed, for example, by the image signal processor 1360. According to an embodiment of the disclosure, the memory

1350 may be configured as at least part of the memory 1230 or as a separate memory that is operated independently from the memory 1230.

The image signal processor 1360 may perform one or more image processing with respect to an image obtained via the image sensor 1330 or an image stored in the memory 1350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1360 may perform control (e.g., exposure time control or read-out timing control) with respect to at least one (e.g., the image sensor 1330) of the components included in the camera module 1280. An image processed by the image signal processor 1360 may be stored back in the memory 1350 for further processing, or may be provided to an external component (e.g., the memory 1230, the display module 1260, the electronic device 1202, the electronic device 1204, or the server 1208) outside the camera module 1280. According to an embodiment of the disclosure, the image signal processor 1360 may be configured as at least part of the processor 1220, or as a separate processor that is operated independently from the processor 1220. If the image signal processor 1360 is configured as a separate processor from the processor 1220, at least one image processed by the image signal processor 1360 may be displayed, by the processor 1220, via the display module 1260 as it is or after being further processed.

According to an embodiment of the disclosure, the electronic device 1201 may include a plurality of camera modules 1280 having different attributes or functions. In such a case, at least one of the plurality of camera modules 1280 may form, for example, a wide-angle camera and at least another of the plurality of camera modules 1280 may form a telephoto camera. Similarly, at least one of the plurality of camera modules 1280 may form, for example, a front camera and at least another of the plurality of camera modules 1280 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the area of the camera area included in the display may be reduced by decreasing the air gap between the camera module and the display. Accordingly, the quality of an image displayed through the display may be improved.

According to the various embodiments of the disclosure, the electronic devices may be configured to maintain the alignment of the camera area included in the display and the camera module located on the display.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a first housing including a first plate structure;
   a second housing including a second plate structure;
   a hinge structure configured to rotate the first housing and the second housing about a folding axis such that the first plate structure and the second plate structure face a same direction or form a predetermined angle therebetween;
   a display including:
     a first flat area disposed on at least part of the first plate structure,
     a second flat area disposed on at least part of the second plate structure,
     a folding area formed between the first flat area and the second flat area and deformable to be flat or curved,
     a panel layer including a pixel array, and
     a support layer stacked on a rear surface of the panel layer; and
   a camera module coupled to the display such that an optical axis of a first lens of the camera module passes through the pixel array,
   wherein the first plate structure or the second plate structure has a first opening formed therein in which at least part of the camera module is accommodated,
   wherein the display further includes a second opening formed through at least portion of the support layer,
   wherein the second opening is at least partially aligned with the first opening in a direction of the optical axis,
   wherein the first lens is located at least partially inside the second opening, and
   wherein the camera module is attached to the rear surface of the panel layer.

2. The electronic device of claim 1,
   wherein the first opening is formed such that a sidewall of the first opening is spaced apart from the camera module by a first gap in a direction of the folding axis and by a second gap in a direction perpendicular to the folding axis, and
   wherein the second gap is greater than the first gap.

3. The electronic device of claim 1,
   wherein a camera area through which the optical axis of the first lens passes is defined in the first flat area or the second flat area, and
   wherein, when the camera module operates, the camera area displays contents different from contents that an area around the camera area displays.

4. The electronic device of claim 1,
   wherein the pixel array includes a first area through which the optical axis of the first lens passes and that includes a field of view (FOV) of the camera module and a second area around the first area, and
   wherein a number of light emitting elements per unit area of the first area is smaller than a number of light emitting elements per unit area of the second area.

5. The electronic device of claim 4,
   wherein the display further includes an aperture layer disposed between the pixel array and the camera module,
   wherein the aperture layer includes a transparent area through which the optical axis of the first lens passes and that includes a field of view of the camera module and an opaque area around the transparent area, and
   wherein the transparent area functions as an aperture of the camera module.

6. The electronic device of claim 5, wherein the transparent area has a smaller area than the first area.

7. The electronic device of claim 1,
   wherein the camera module comprises a lens assembly including a plurality of lenses,
   wherein the lens assembly further includes a lens barrel configured to surround at least a part of the plurality of lenses,
   wherein lens assembly further includes an adhesive area attached to an outer side surface of the lens barrel and to a rear surface of the panel layer, and
   wherein the adhesive area is substantially flat where attached to the rear surface of the panel layer, and
   wherein the adhesive area surrounds the second opening.

8. The electronic device of claim 7,
   wherein the plurality of lenses include the first lens,
   wherein the first lens is closest to the display among the plurality of lenses,
   wherein the first lens includes a flat area formed to be substantially flat, and
   wherein the camera module is coupled to the display such that the flat area of the first lens is attached to a rear surface of the panel layer.

9. The electronic device of claim 8,
   wherein the pixel array includes a first area through which the optical axis passes and that includes a field of view (FOV) of the camera module and a second area around the first area,
   wherein a number of light emitting elements per unit area of the first area is smaller than a number of light emitting elements per unit area of the second area, and
   wherein the flat area of the first lens, when viewed from above the panel layer, has an area greater than or equal to that of the first area.

* * * * *